US012652592B2

(12) United States Patent
Lee et al.

(10) Patent No.: US 12,652,592 B2
(45) Date of Patent: Jun. 9, 2026

(54) APPARATUS AND METHOD FOR INTER-PLMN HANDOVER OF HOME ROUTED SESSION IN WIRELESS COMMUNICATION SYSTEM

(71) Applicant: Samsung Electronics Co., Ltd., Gyeonggi-do (KR)

(72) Inventors: Jicheol Lee, Gyeonggi-do (KR); Hyesung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 266 days.

(21) Appl. No.: 18/399,928

(22) Filed: Dec. 29, 2023

(65) Prior Publication Data

US 2024/0224147 A1 Jul. 4, 2024

(30) Foreign Application Priority Data

Dec. 30, 2022 (KR) ........................ 10-2022-0190516
Feb. 8, 2023 (KR) ........................ 10-2023-0016888

(51) Int. Cl.
*H04W 36/14* (2009.01)
*H04W 36/00* (2009.01)
*H04W 84/04* (2009.01)

(52) U.S. Cl.
CPC ..... *H04W 36/142* (2023.05); *H04W 36/0022* (2013.01); *H04W 84/042* (2013.01)

(58) Field of Classification Search
CPC ........... H04W 36/142; H04W 36/0022; H04W 84/042

(Continued)

(56) References Cited

U.S. PATENT DOCUMENTS

2012/0164979 A1 6/2012 Bachmann et al.
2015/0031371 A1* 1/2015 Zhao ................. H04W 36/0058
455/439

(Continued)

FOREIGN PATENT DOCUMENTS

KR 10-2023-0050048 4/2023
WO WO 2024/144154 7/2024

OTHER PUBLICATIONS

Samsung, "Procedure for PDU Session Supporting HR-SBO in VPLMN", S2-2211366, 3GPP TSG-WG SA2 Meeting #154, Nov. 14-18, 2022, 4 pages.

(Continued)

*Primary Examiner* — Don N Vo
(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. A method performed by a visited-session management function (V-SMF) in a visited public land mobile network (VPLMN) includes receiving, from an access and mobility management function (AMF) in the VPLMN, a protocol data unit (PDU) session create request message including an indicator for allowing home-routed session breakout (HR-SBO) and an identifier (ID) of the VPLMN after an inter-public land mobile network (PLMN) handover is performed, transmitting, to a home-SMF (H-SMF) in a home PLMN (HPLMN), a PDU session update request message including the ID of the VPLMN and an HR-SBO request message, and receiving, from the H-SMF, a PDU session update response message including an authorization result for the HR-SBO.

16 Claims, 12 Drawing Sheets

(58) Field of Classification Search
USPC ........................................................ 455/436
See application file for complete search history.

(56) References Cited

U.S. PATENT DOCUMENTS

| | | | | |
|---|---|---|---|---|
| 2019/0069207 | A1* | 2/2019 | Cho | H04W 36/142 |
| 2020/0120570 | A1* | 4/2020 | Youn | H04W 8/08 |
| 2020/0187277 | A1* | 6/2020 | Lee | H04W 76/12 |
| 2020/0389931 | A1* | 12/2020 | Kumar | H04W 8/12 |
| 2021/0029608 | A1* | 1/2021 | Dodd-Noble | H04W 36/0066 |
| 2023/0116405 | A1 | 4/2023 | Lee et al. | |

OTHER PUBLICATIONS

3GPP TS 23.502 V18.0.0, 3rd Generation Partnership Project; Technical Specification Group Services and System Aspects; Procedures for the 5G System (5GS); Stage 2 (Release 18), Dec. 2022, 773 pages.
3GPP TS 23.501 V18.0.0, 3rd Generation Partnership Project; Technical Specification Group Services and System Aspects; System Architecture for the 5G System (5GS); Stage 2 (Release 18), Dec. 2022, 593 pages.
Samsung, "SMF Selection Data for HR SBO in VPLMN", S2-2211105, 3GPP TSG-WG SA2 Meeting #154, Nov. 14-18, 2022, 11 pages.
International Search Report dated Apr. 2, 2024 issued in counterpart application No. PCT/KR2023/021899, 8 pages.
Samsung, "HR-SBO Re-Authorization Procedure Due to VPLMN Change", S2-2307284, 3GPP TSG-WG SA2 Meeting #156e, May 22-26, 2023, 2 pages.
European Search Report dated Feb. 10, 2026 issued in counterpart application No. 23912995.0-1206, 16 pages.

* cited by examiner

FIG. 1

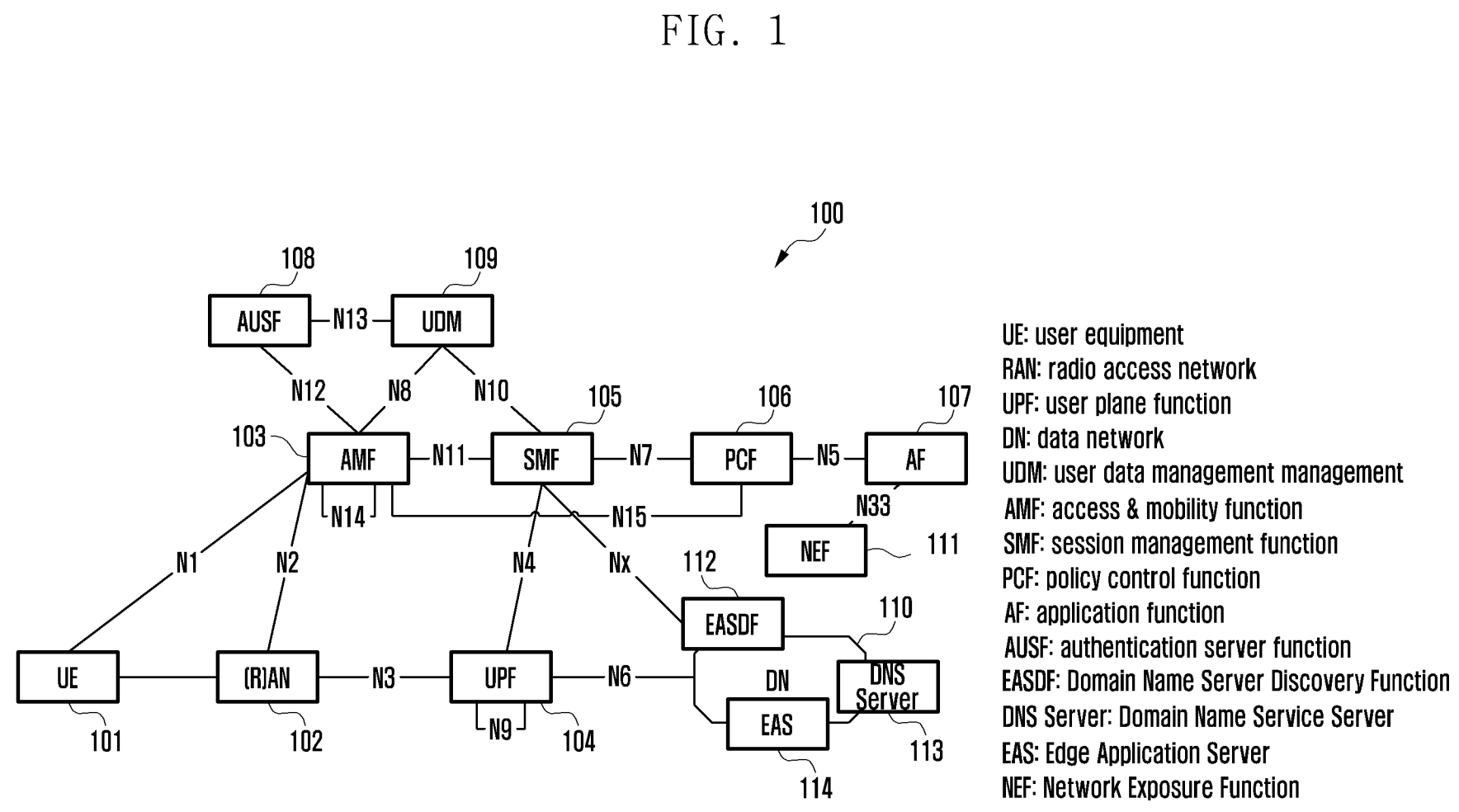

UE: user equipment
RAN: radio access network
UPF: user plane function
DN: data network
UDM: user data management management
AMF: access & mobility function
SMF: session management function
PCF: policy control function
AF: application function
AUSF: authentication server function
EASDF: Domain Name Server Discovery Function
DNS Server: Domain Name Service Server
EAS: Edge Application Server
NEF: Network Exposure Function

FIG. 2

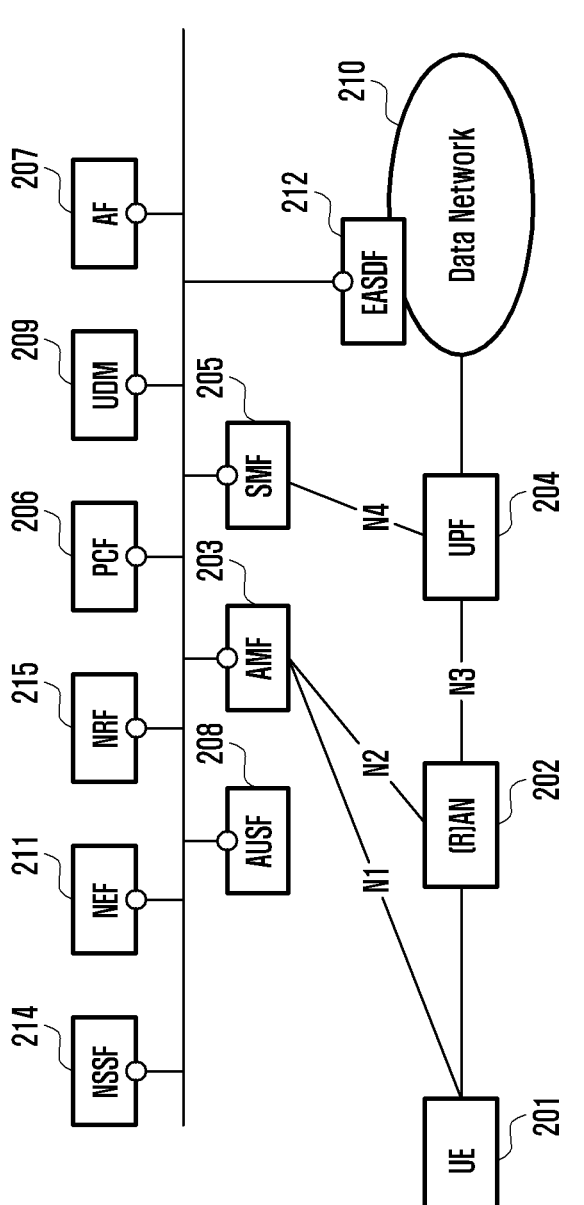

Network Functions
AMF: Access Mobility Management Function
SMF: Session Management Function
PCF: Policy Control Function
UPF: User Plane Function
AUSF: Authentication Server Function
UDM: Unified Data Management
AF: Application Function
NSSF: Network Slice Selection Function
NEF: Network Exposure Function
NRF: Network Repository Function
EASDF: Edge Application Discovery Function Network Entities
DN: Data Network
[R]AN: [Radio] Access Network
UE: User Equipment

Figure 8B:
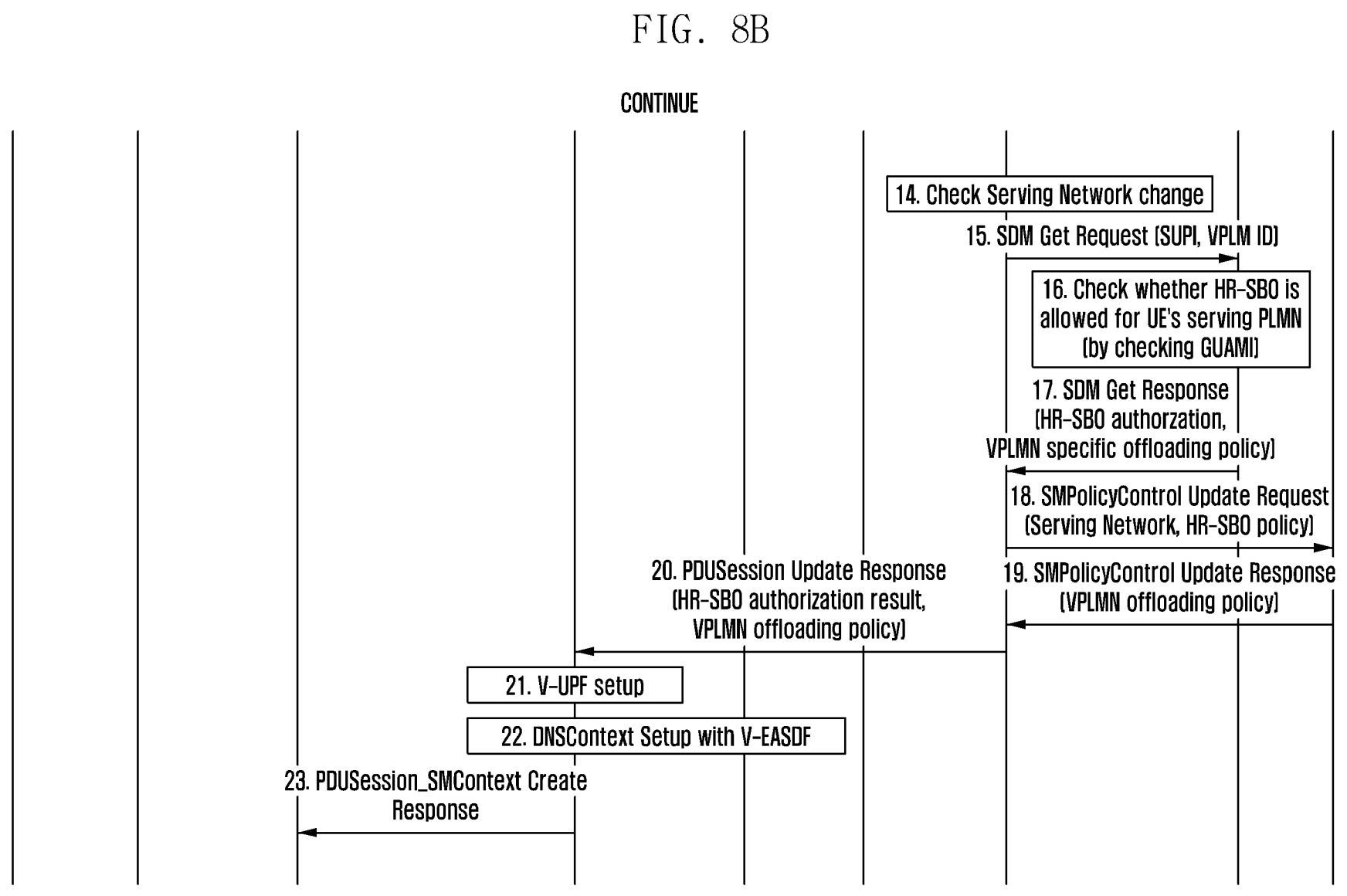

14. Check Serving Network change

15. SDM Get Request [SUPI, VPLM ID]

16. Check whether HR-SBO is allowed for UE's serving PLMN (by checking GUAMI)

17. SDM Get Response [HR-SBO authorzation, VPLMN specific offloading policy]

18. SMPolicyControl Update Request [Serving Network, HR-SBO policy]

19. SMPolicyControl Update Response [VPLMN offloading policy]

20. PDUSession Update Response [HR-SBO authorization result, VPLMN offloading policy]

21. V-UPF setup

22. DNSContext Setup with V-EASDF

23. PDUSession_SMContext Create Response

900

APPARATUS AND METHOD FOR INTER-PLMN HANDOVER OF HOME ROUTED SESSION IN WIRELESS COMMUNICATION SYSTEM

CROSS REFERENCE TO RELATED APPLICATIONS

The present application claims priority to Korean Patent Application Nos. 10-2022-0190516 and 10-2023-0016888, filed in the Korean Intellectual Property Office on Dec. 30, 2022, and Feb. 8, 2023, respectively, the entire contents of which are incorporated herein by reference.

BACKGROUND

1. Field

The disclosure relates generally to a wireless communication system, and more particularly, to subscriber information to support a session breakout method in the wireless communication system.

2. Description of Related Art

Fifth generation (5G) mobile communication technologies define broad frequency bands such that high transmission rates and new services are possible, and can be implemented not only in sub 6 gigahertz (GHz) bands such as 3.5 GHz, but also in above 6 GHz bands referred to as millimeter wave (mmWave) including 28 GHz and 39 GHz. In addition, it has been considered to implement 6G mobile communication technologies referred to as beyond 5G systems in terahertz (THz) bands, such as 95 GHz to 3 THz bands to reach transmission rates fifty times faster than 5G mobile communication technologies and ultra-low latencies one-tenth of 5G mobile communication technologies.

Since the outset of the development of 5G mobile communication technologies, to support services and to satisfy performance requirements in connection with enhanced mobile broadband (eMBB), ultra reliable low latency communications (URLLC), and massive machine-type communications (mMTC), there has been ongoing standardization regarding beamforming and massive multiple input multiple output (MIMO) for mitigating radio-wave path loss and increasing radio-wave transmission distances in mmWave, supporting numerologies such as operating multiple subcarrier spacings for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, level 2 (L2) pre-processing, and network slicing for providing a dedicated network specialized to a specific service.

Discussions are ongoing regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN) which is UE-satellite direct communication for providing coverage in an area in which communication with terrestrial networks is unavailable, and positioning.

Moreover, there is ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G service based architecture or service based interface for combining network functions virtualization (NFV) and software-defined networking (SDN) technologies, and mobile edge computing (MEC) for receiving services based on UE positions.

As 5G mobile communication systems are commercialized, it is expected that the number of devices that will be connected to communication networks will exponentially increase. Thus, it is anticipated that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR) and the like, 5G performance improvement and complexity reduction by utilizing artificial intelligence (AI) and machine learning (ML), AI service support, metaverse service support, and drone communication.

Such development of 5G mobile communication systems will serve as a basis for developing not only new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

In the conventional art, it is desired to enable a roaming terminal to access to an edge application server (EAS) provided through a protocol data unit (PDU) session of a visited network through a local breakout PDU session, which is a session management technology provided by the data network of an existing visited public land mobile network (VPLMN). However, when handover to a home PLMN (HPLMN) occurs in a roaming situation, two PDU sessions are required. In addition, more than two data network names (DNNs) are needed to distinguish between two PDU sessions, and using UE route selection policy (URSP) rules to control the sessions is exceedingly complex.

Thus, there is a need in the art for a method that allows connection to a data network (DN) provided by a home network in one PDU session while simultaneously connecting to a local DN provided by a visited network.

SUMMARY

This disclosure has been made to address at least the above-mentioned problems and/or disadvantages and to provide at least the advantages described below.

Accordingly, an aspect of the disclosure is to provide a method and apparatus for subscriber information to support a session breakout method in a wireless communication system through adding/changing/deleting a local user plane function (UPF) in a visited network for a home routed session of a roaming terminal and a session management method based on the subscriber information in a cellular wireless communication system.

An aspect of the disclosure is to provide a method for an HPLMN to update the usage right for a home-routed session breakout (HR-SBO) session allowed by a VPLMN when an event occurs in which a roaming terminal moves to a serving network in the VPLMN.

An aspect of the disclosure is to enable a roaming terminal to access to an edge application server (EAS) provided in an edge computing environment of a visited PLMN network in a visited PLMN using a home routing session using uplink classifier (ULCL)/branching point (BP) technology, which is a 5G session management function.

An aspect of the disclosure is to provide a method to have an HR-SBO session for using edge computing services in a visited network to a terminal even though a target VPLMN provides HR-SBO when an inter-PLMN handover occurs where the VPLMN is changed.

An aspect of the disclosure is to enable a terminal, while roaming, to simultaneously receive a service provided by a DN connected to a home network and an edge computing service provided by a visited network in one PDU session.

An aspect of the disclosure is to enable a terminal to access an edge computing service through edge hosting environment (EHE) provided by the visited network while roaming, without creating an additional PDU session.

An aspect of the disclosure is to provide a method for a terminal to receive HR-SBO service in a target PLMN, when a VPLMN to which a terminal initially connects during roaming does not provide HR-SBO, and when the terminal makes an inter-PLMN HO to a VPLMN that provides HR-SBO service.

In accordance with an aspect of the disclosure, a method performed by a visited-session management function (V-SMF) in a visited public land mobile network (VPLMN) includes receiving, from an access and mobility management function (AMF) in the VPLMN, a protocol data unit (PDU) session create request message including an indicator for allowing home-routed session breakout (HR-SBO) and an identifier (ID) of the VPLMN after an inter-public land mobile network (PLMN) handover is performed, transmitting, to a home-SMF (H-SMF) in a home PLMN (HPLMN), a PDU session update request message including the ID of the VPLMN and an HR-SBO request message, and receiving, from the H-SMF, a PDU session update response message including an authorization result for the HR-SBO.

In accordance with an aspect of the disclosure, a method performed by a home-session management function (H-SMF) in an HPLMN includes receiving, from a visited-SMF (V-SMF) in a visited public land mobile network (VPLMN), a PDU session update message including an HR-SBO request message and an ID of the VPLMN after an inter-PLMN handover is performed, transmitting, to a UDM, an SDM request message, receiving, from the UDM, an SDM response message including an authorization result for the HR-SBO, and transmitting, to the V-SMF, a PDU session update response message including an authorization result for the HR-SBO.

In accordance with an aspect of the disclosure, a V-SMF in a VPLMN includes a transceiver, and a controller configured to receive, from an AMF in the VPLMN, a PDU session create request message including an indicator for allowing an HR-SBO and an ID of the VPLMN after an inter-PLMN handover is performed, transmit, to an H-SMF in an HPLMN, a PDU session update request message including the ID of the VPLMN and an HR-SBO request message, and receive, from the H-SMF, a PDU session update response message including an authorization result for the HR-SBO.

In accordance with an aspect of the disclosure, an H-SMF in an HPLMN includes a transceiver, and a controller configured to receive, from a V-SMF in a VPLMN, a PDU session update message including an HR-SBO request message and an ID of the VPLMN after an inter-PLMN handover is performed, transmit, to a UDM, an SDM request message, receive, from the UDM, an SDM response message including an authorization result for the HR-SBO, and transmit, to the V-SMF, a PDU session update response message including an authorization result for the HR-SBO.

BRIEF DESCRIPTION OF THE DRAWINGS

The above and other aspects, features, and advantages of certain embodiments of the disclosure will be more apparent from the following detailed description taken in conjunction with the accompanying drawings, in which:

FIG. 1 illustrates a 5G system structure expressed as a reference point according to an embodiment;

FIG. 2 illustrates the structure of a 5G system on a service basis according to an embodiment;

FIGS. 8A and 8B illustrate an inter-PLMN mobility procedure for an HR-SBO session in a wireless communication system according to an embodiment;

DETAILED DESCRIPTION

Figure 3:
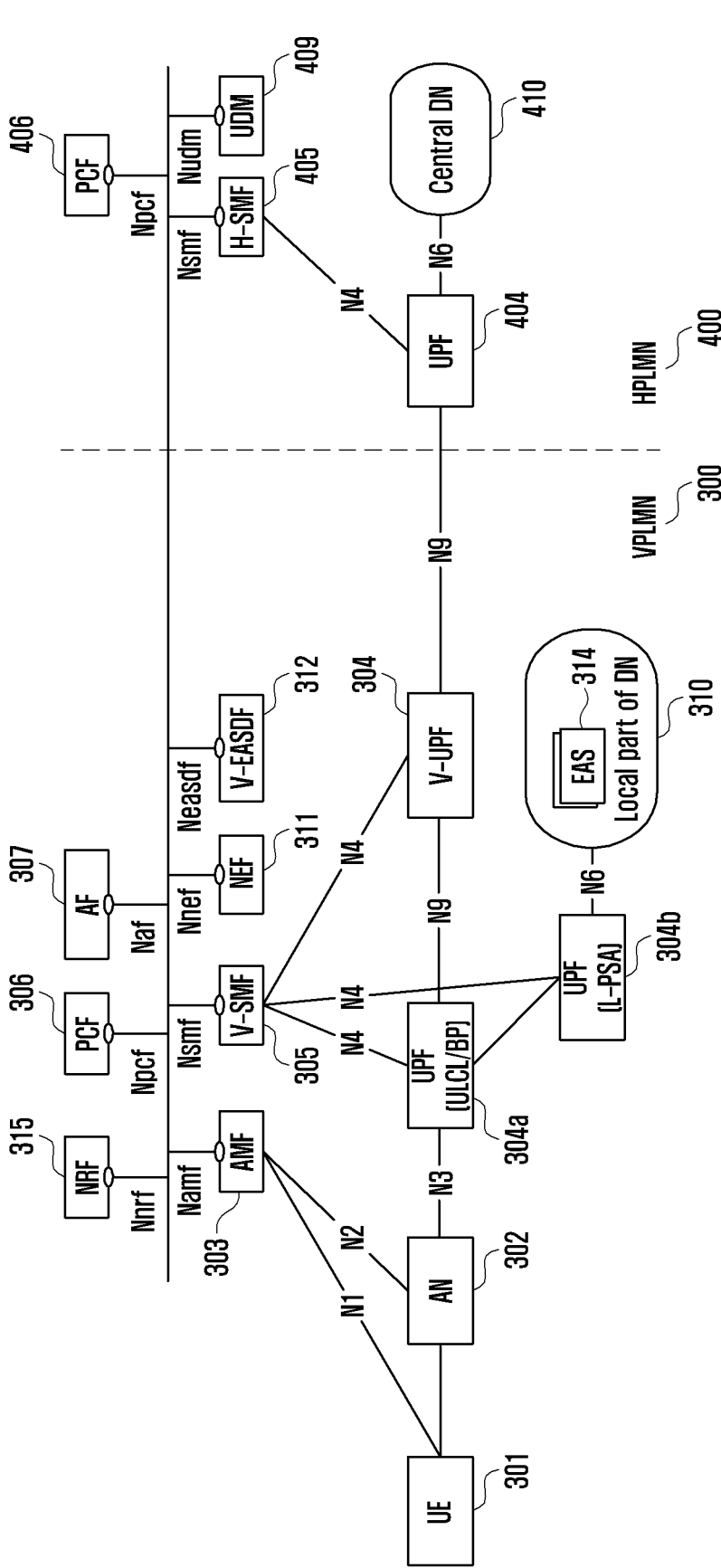
FIG. 3 illustrates a service-based 5G system roaming structure that provides HR-SBO in a roaming situation according to an embodiment.

Embodiments of the disclosure will be described in detail in conjunction with the accompanying drawings. A detailed description of known functions or configurations incorporated herein will be omitted when it may make the subject matter of the disclosure rather unclear. The terms which will be described below are defined in consideration of the functions in the disclosure, and may be different according to users, intentions of operators, or customs. Therefore, the definitions of the terms should be made based on the contents throughout the specification. Similarly, some elements in the accompanying drawings may be exaggerated, omitted or schematically illustrated. The size of each element does not necessarily reflect the actual size of the element. In the drawings, identical or corresponding elements are provided with identical reference numerals.

Elements included in the disclosure are expressed in a singular or plural form according to the embodiments of an embodiment; However, the singular or plural form is appropriately selected for convenience of explanation and the disclosure is not limited thereto. As such, an element expressed in a plural form may also be constituted as a single element, and an element expressed in a singular form may also be constituted as plural elements.

Advantages and features of the technical spirit according to the disclosure, and methods for achieving the same may be understood through the embodiments to be described below taken in conjunction with the accompanying drawings. However, the disclosure is not limited to the embodiments disclosed herein, and various changes may be made thereto. The embodiments are provided only to completely disclose the disclosure and fully inform those skilled in the art of the scope of the disclosure. Throughout the specification, the same or like reference numerals designate the same or like elements. Terms described herein are defined by considering functions in the disclosure, and may be different depending on a user, operating intention or practice, etc. Accordingly, each term should be defined based on contents over the entire specification.

Hereinafter, a BS, which is an entity for allocating resources to a terminal, may include at least one of an eNode B, a Node B, a radio access network (RAN), an access network (AN), a RAN node, a radio access unit, a BS controller, and a node on a network. The terminal may include a user equipment (UE), a mobile station (MS), a cellular phone, a smartphone, a computer, or a multimedia system capable of performing a communication function. In the disclosure, a downlink (DL) denotes a wireless transmission path of a signal transmitted to a UE from a BS, and an uplink (UL) denotes a wireless transmission path of a signal transmitted to a BS from a UE. The long-term evolution (LTE) or LTE-advanced (LTE-A) system is described herein, but the disclosure may be applied to other communication systems having a similar technical background or channel form. For example, the disclosure may be applicable to a 5G NR communication technology developed after LTE-A system, where 5G may indicate a concept including LTE, LTE-A, and other similar services according to the related art.

The term unit used herein refers to a software or hardware component, such as a field-programmable gate array (FPGA) or an application-specific integrated circuit (ASIC), which may perform certain tasks. However, the term unit is not limited to software or hardware and may be configured in an addressable storage medium or may be configured to reproduce one or more processors. Thus, for example, the term unit may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. The functionality provided in components and unit may be combined into fewer components and unit or may be further separated into additional components and unit. The components and unit may be implemented to operate one or more central processing units (CPUs) in a device or a secure multimedia card. The unit may include one or more processors.

FIG. 1 illustrates a network structure and interface of a 5G system according to an embodiment. A network entity included in the network structure of the 5G system of FIG. 1 may include a network function (NF) according to a system implementation.

In FIG. 1, a network structure of a 5G system 100 may include various network entities. For example, the 5G system 100 may include an authentication server function (AUSF) 108, a (core) access and mobility management function (AMF) 103, a session management function (SMF) 105, a policy control function (PCF) 106, an application function (AF) 107, a unified data management (UDM) 109, a data network (DN) 110, a network exposure function (NEF) 113, an edge application server (EAS) 114, an EAS discovery function (EASDF) 112, a UPF 104, a (radio) access network (R)AN 102, and a terminal, i.e., a UE (UE) 101.

Each of the NFs of the 5G system 100 may support the functions described below.

The AUSF 108 may process and store data for authentication of the UE 101.

The AMF 103 may provide a function for access and mobility management in units of UE, and one UE may be connected to one AMF by default. Particularly, the AMF 103 may support functions, including a signaling between CN nodes for mobility between $3^{rd}$ generation partnership project (3GPP) access networks, termination of a radio access network (RAN) control plane (CP) interface (i.e., an N2 interface), termination of a non-access stratum (NAS) signaling (N1), NAS signaling security (NAS ciphering and integrity protection), access stratum (AS) security control, registration management (registration area management), connection management, idle mode UE reachability (including control and performance of paging retransmission), mobility management control (subscription and policy), support for intra-system mobility and inter-system mobility, support for network slicing, SMF selection, lawful intercept (LI) (for AMF events and interfaces to the LI system), providing delivery of session management (SM) messages between the UE and SMF, a transparent proxy for SM message routing, access authentication, access authorization including roaming permission check, providing delivery of SMS messages between the UE and the SMF, a security anchor function (SAF), and/or security context management (SCM). Some or all of functions of the AMF 103 may be supported within a single instance of one AMF.

For example, the DN 110 denotes an operator service, Internet access, a 3rd party service, or the like. The DN 110 may transmit a DL protocol data unit (PDU) to the UPF 104 or receive a PDU transmitted from the UE 101 from the UPF 104.

The PCF 106 may receive information on packet flow from an application server and determine policies, such as mobility management and session management. Specifically, the PCF 106 may support functions of, for example, supporting a unified policy framework to control network behavior, providing policy rules so that control plane function(s) (e.g., AMF, SMF, etc.) may enforce the policy rules, and implementing a front end for accessing relevant subscription information for policy determination in a user data repository (UDR).

The SMF 105 may provide a session management function, and when the UE has a plurality of sessions, each session may be managed by a different SMF. Specifically, the SMF 105 may support functions, including session management (e.g., session establishment, modification, and termination including tunnel maintenance between the UPF 104 and the (R)AN 102 nodes, UE Internet protocol (IP) address allocation and management (optionally with authentication), selection and control of user plane (UP) functions, traffic steering configuration for routing traffic to appropriate destinations in the UPF 104, termination of interfaces towards policy control functions, enforcement of policies and control portions of quality of service (QOS), lawful intercept (for SM events and interfaces to the LI system), termination of a SM portion of a NAS message, DL data notification, an initiator of access network (AN) specific SM information (transferred to the (R)AN 102 via the N2 and the AMF 103), determination of a session and service continuity (SSC) mode of a session, and a roaming function. Some or all of functions of the SMF 105 may be supported within a single instance of one SMF.

The UDM 109 may store a user's subscription data, policy data, and the like. The UDM 109 may include two portions, i.e., an application front end (FE) and a user data repository (UDR).

The FE may include a UDM-FE in charge of location management, subscription management, and credential processing and a PCF in charge of policy control. The UDR may store data required for the functions provided by the UDM-FE and a policy profile required by the PCF. The data stored in the UDR may include user subscription data and policy data, the user subscription data including a subscription identifier, a security credential, access and mobility-related subscription data, and session-related subscription data. The UDM-FE may access the subscription information stored in the UDR and support functions, such as authentication credential processing, user identification handling, access authentication, registration/mobility management, subscription management, and short message service (SMS) management.

The UPF 104 may deliver a DL PDU received from the DN 110 to the UE 101 via the (R)AN 102 and an UL PDU received from the UE 101 via the (R)AN 102 to the DN 110. Specifically, the UPF 104 may support functions, including an anchor point for intra/inter radio access technology (RAT) mobility, an external PDU session point of interconnection to a data network, packet routing and forwarding, a user plane part of packet inspection and policy rule enforcement, lawful intercept, traffic usage report, a UL classifier for supporting traffic flow routing to a data network, a branching point for supporting a multi-homed PDU session, QoS handling for a user plane (e.g., packet filtering, gating, UL/DL rate enforcement), UL traffic verification (service data flow (SDF) mapping between an SDF and a QoS flow), transport level packet marking in UL and DL, DL packet buffering, and DL data notification triggering. Some or all of functions of the UPF 104 may be supported within a single instance of one UPF.

The AF 107 may interwork with the 3GPP core network to provide services such as impact of an application on traffic routing, access to network capability exposure, and interworking with policy frameworks for policy control.

The (R)AN 102 collectively refers to a new radio access network that supports both evolved universal mobile telecommunications system terrestrial radio access (E-UTRA), which is an evolved version of 4th generation (4G) radio access technology, and a new radio access technology (new radio (NR)) (e.g., gNB).

The gNB may support functions, including functions for radio resource management (i.e., radio bearer control, radio admission control, connection mobility control, dynamic allocation of resources to a UE via UL/DL (i.e., scheduling)), IP header compression, encryption and integrity protection of a user data stream, selection of the AMF upon attachment of a UE when routing to the AMF is not determined from information provided to the UE, user plane data routing to the UPF(s), a control plane information routing to the AMF, connection setup and termination, scheduling and transmission (generated from the AMF) of paging messages, scheduling and transmission (generated from the AMF or operating and maintenance (O&M)) of system broadcast information, measurement and measurement reporting configuration for mobility and scheduling, transport level packet marking in UL, session management, support for network slicing, QoS flow management and mapping to data radio bearers, support of UE in inactive mode, a NAS message distribution function, a NAS node selection function, a radio access network sharing, dual connectivity, and tight interworking between NR and E-UTRA.

The UE 101 may be referred to as a terminal, mobile equipment (ME), a mobile station (MS), and may be a portable device, such as laptops, mobile phones, personal digital assistants (PDA), smartphones, or multimedia devices, or may be a non-portable device, such as personal computers (PC) or vehicle-mounted devices.

The NEF 111 may provide a means for securely exposing services and capabilities provided by 3GPP network functions for third parties, internal exposure/re-exposure, application functionality, or edge computing. The NEF 111 may receive information (based on exposed capability (capabilities) of other NF(s)) from the other NF(s) and may store the received information as structured data by using a standardized interface to a data storage network function. The stored information may be re-exposed to the other NF(s) and AF(s) by the NEF 111 and used for other purposes, such as analysis.

The EASDF 112 may be an NF that may add, for each fully qualified domain name (FQDN), an extension DNS client subnet (ECS) option that may be expressed as an address of a domain name system (DNS) server to which a DNS request is to be forwarded from a UE and as an IP subnet address that may be added when forwarding the DNS request by the UE. The EASDF 112 may receive DNS processing rules from the SMF and process the DNS request message received from the UE according to the received information. The EASDF 112 may be an NF that performs functions of receiving, from the SMF 105, a UE IP address, location information of the UE in 3GPP, a DNS message processing rules, DNS message reporting rules, processing a DNS query message received from the UE and a DNS response message received from the DNS server, and transmitting, to the SMF 105, information in the DNS message and statistic information obtained by processing the information, according to a DNS message report rule.

Figure 5:
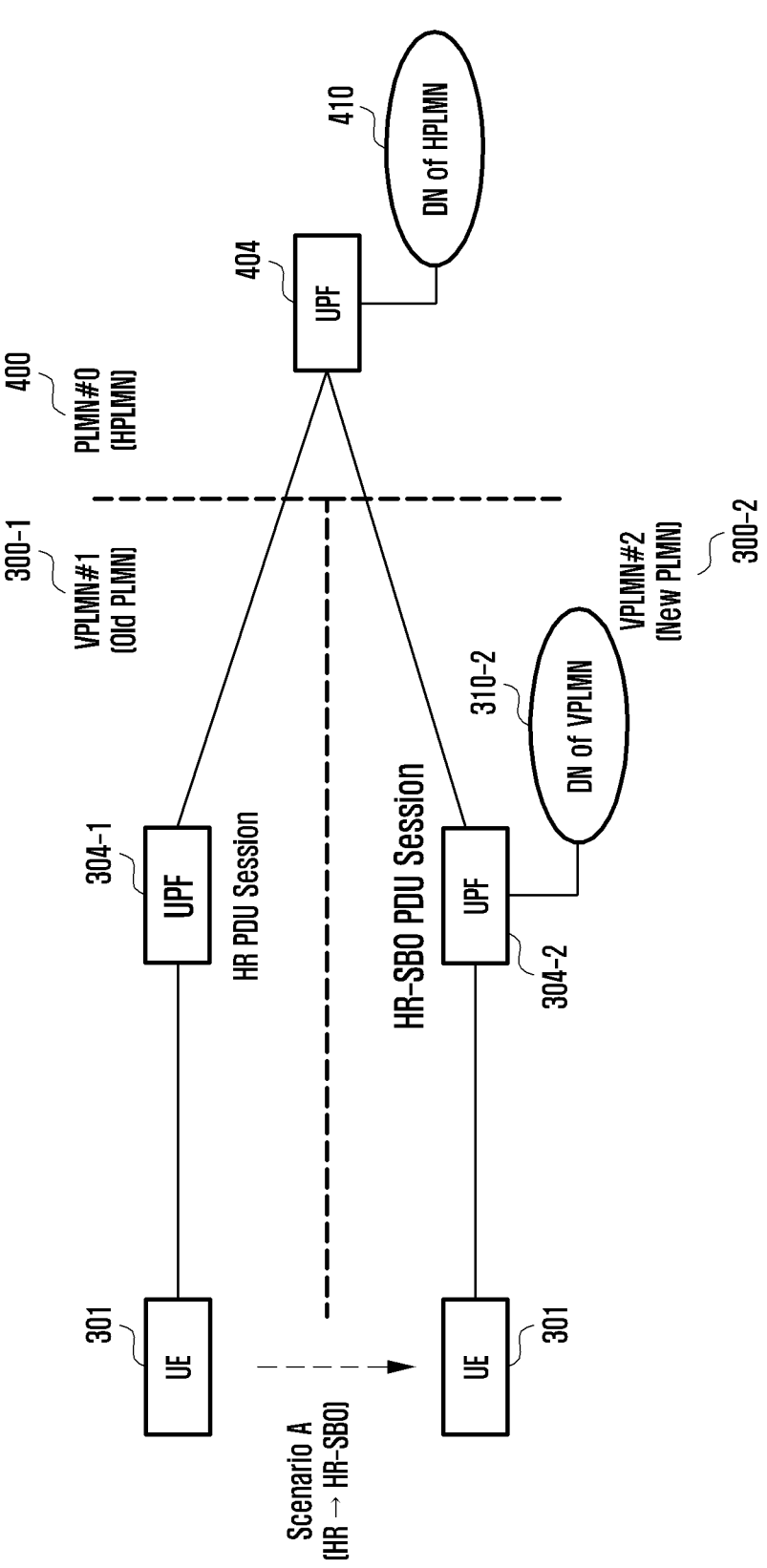
FIG. 5 illustrates Inter-PLMN movement scenario A for an HR-SBO session (HR→HR-SBO) in a wireless communication system according to an embodiment.

An NF repository function (NRF) is not shown in FIG. 1, but all NFs shown in FIG. 5 can interact with the NRF as needed.

The NRF may support a service discovery function, may receive an NF discovery request from an NF instance, and may provide information about the found NF instance to the NF instance. The NRF may maintain available NF instances and services supported by the NF instances.

FIG. 1 illustrates a reference model for a case in which UE 101 accesses one DN 110 by using one PDU session. However, the disclosure is not limited thereto.

The UE 101 may simultaneously access two (i.e., local and central) data networks by using a plurality of the PDU sessions. In this case, two SMFs may be selected for PDU sessions that are different from each other. However, each of the SMFs may have a capability to control both a local UPF and a central UPF within the PDU session.

The UE 101 may simultaneously access two (i.e., local and central) data networks provided within a single PDU session.

In a 3GPP system, a conceptual link connecting between NFs in the 5G system is defined as a reference point. As an example, reference point(s) included in the 5G system 100 of FIG. 1 are as follows:

N1: reference point between the UE 101 and the AMF 103

N2: reference point between the (R)AN 102 and the AMF 103

N3: reference point between the (R)AN 102 and the UPF 104

N4: reference point between the SMF 105 and the UPF 104

N5: reference point between the PCF 106 and the AF 107

N6: reference point between the UPF 104 and the DN 110

N7: reference point between the SMF 105 and the PCF 106

N8: reference point between the UDM 109 and the AMF 103

N9: reference point between two core UPFs 104

N10: reference point between the UDM 109 and the SMF 105

N11: reference point between the AMF 103 and the SMF 105

N12: reference point between the AMF 103 and the AUSF 108

N13: reference point between the UDM 109 and the AUSF 108

N14: reference point between two AMFs 103

N15: reference point between the PCF 106 and the AMF 103 in a non-roaming scenario, and reference point between the PCF 106 in visited network and the AMF 103 in a roaming scenario Nx: reference point between the SMF 105 and the EASDF 112

FIG. 2 illustrates the network structure of the 5G system of FIG. 1 on a service basis according to an embodiment.

In FIG. 2, the 5G system 200 may include a UE 201, a (R)AN 202, an AMF 203, a UPF 204, an SMF 205, a PCF 206, an AF 207, an AUSF 208, a UDM 209, a DN 210, an NEF 211, an EASDF 212, a network slicing selection function (NSSF) 214, and an NRF 215.

The UE 201, (R)AN 202, AMF 203, UPF 204, SMF 205, PCF 206, AF 207, AUSF 208, UDM 209, DN 210, NEF 211 and EASDF 212 of FIG. 2 perform the same function as the UE 101, (R)AN 102, AMF 103, UPF 104, SMF 105, PCF

106, AF 107, AUSF 108, UDM 109, DN 110, NEF 111, EASDF 112, and DNS server 113 of FIG. 1.

The NSSF 214 may select a set of network slice instances serving the UE 201. The NSSF 214 may determine granted network slice selection assistance information (NSSAI) and may perform mapping to subscribed single-network slice selection assistance information (S-NSSAI), if necessary. The NSSF 214 may determine the configured NSSAI and may perform mapping to subscribed S-NSSAIs, if necessary. The NSSF 214 may determine the AMF set used to serve the UE or query the NRF 215 according to the configuration to determine a list of candidate AMFs.

The NRF 215 may support a service discovery function which may receive an NF discovery request from an NF instance and provide discovered NF instance information to the NF instance. The NRF 215 may maintain available NF instances and their supporting services.

FIG. 3 illustrates a network structure supporting session breakout (ULCL/BP UPF) in a home routing roaming scenario according to an embodiment. The NF of the visited network 300 and the NFs of the home network 400 are further described compared to FIG. 2.

FIG. 3 illustrates a network structure supporting session breakout (ULCL/BP UPF) in a home routing roaming scenario. Compared to FIG. 2, the NF of the visited network and the NFs of the home network are further described.

The visited network 300 may include an AMF 303, a V-SMF 305, a V-UPF 304, a V-EASDF 312, and a visited DNS server 310.

The AMF 303 may exist in the visited network 300. The AMF 303 may receive and store a visited session breakout (SBO) allowed indicator from the UDM during the registration procedure of the UE 301. If the AMF 303 confirms the request for DNN/S-NSSAI transmitted by the UE 301 in the PDU session creation procedure, the AMF 303 may transmit the visited SBO allowed indicator to the V-SMF 305. Since a request for the HR session is transmitted, the AMF 303 may also transmit, with the request, the address or identifier of the H-SMF 305.

The V-SMF 305 may perform tunnel management for an H-UPF 404 through the visited UPF 304. The V-SMF 305 may determine session breakout (ULCL/BP) in the visited network 300, and manage a UP session for an L-PSA UPF 304-*b*, a ULCP/BP UPF 304*a*, and the V-UPF 304 via N4. The V-SMF 305 may transmit HR-SBO support-related information to the H-SMF 405 to perform an addition/change/deletion event for a local UPF. The V-SMF 305 may be NF that manages the session of the UE 301 in the visited network 300. If the UE 301 requests creation of the PDU session, the V-SMF 305 may receive a request message requesting the creation of the PDU session from the AMF 303. The V-SMF 305 may receive an HR-SBO allowed indicator and a request message including identifier/address of the H-SMF 405 from the AMF 303. The V-SMF 305 receives an HR-SBO allowed indicator from the AMF 303, and in the case of a home routing session, when receiving the H-SMF identifier/IP address from the AMF 303, the V-SMF 305 may transfer a request message for HR session creation to the H-SMF 405. The V-SMF 305 may include an indicator requesting providing HR-SBO (or an indicator indicating support for HR-SBO function) to a request message for creating an HR session and transmit the request message to the H-SMF 405. The V-SMF 305 may transfer the address of the V-EASDF 312 (visited DNS server address) to the H-SMF 405. The V-SMF 305 may transfer the routing rule for LDN to H-SMF 405. The visited SMF 305 may determine whether to add/change/delete the ULCP/BP 304*a* and Local UPF 304*b*. In case of adding the ULCL UPF 304*b*, the V-SMF 305 may report the network address for the LDN to be forwarded to the Local UPF 304*a* to the H-SMF 405. The H-SMF 405 of the home PLMN 400 may be responsible for packet forwarding of the HR session.

The V-UPF 304 may be an NF that transmits traffic occurring within the visited network 300 to the H-UPF 404. When the UE 301 is in an idle state, the V-UPF 304 may perform DL data packet buffering. The V-UPF 304 may perform packet forwarding function through an N9 tunnel with the H-UPF 404. The V-UPF 304 may support the ULCL/BP UPF 304*a* or Local UPF 304*b* function together or may exist independently. The V-UPF 304 may be provided in a form in which the ULCL/BP UPF 304*a* or the Local UPF 304*b* is separated.

The L-PSA UPF 304*b* may be a NF that performs a local PSA UPF function. The L-PSA UPF 304*b* may be connected to the Local part of the DN 314 through N6. The L-PSA UPF 304*b* may perform forwarding of packets transmitted and received between the UE 301 and the EAS 314 of the visited network 300.

The ULCL/BP UPF 304*a* may be UPF that branches the PDU. The ULCL/BP UPF 304*a* may receive a packet forwarding rule corresponding to an UL classifier from the V-SMF 305, and may perform the functions of branching and forwarding the packets, received from the UE 301, to the UPF 304 through the destination address of the UE 301 or the IPV6 prefix of the UE 301.

The V-EASDF 312 may perform an EAS discovery function in the visited network 300. The V-EASDF 312 located in the visited network 300 may be connected to the V-SMF 305. The V-EASDF 312 may receive the DNS message handling rules for the session level and the node level from the V-SMF 305. The address of the V-EASDF 312 may be used as a DNS address transferred to the UE 301 as protocol configuration options (PCO) when a PDU session is created or changed. The home DNS server address may be transferred to the V-EASDF 312 through a message handling rule for the DNS query from the V-SMF 305. The DNS message handling rule may be used as the DNS server address for forwarding the DNS query of the V-EASDF 312 to allow the DNS query to be transmitted to the DNS server of the home network 400 for resolution of the IP address for the FQDN included in the DNS query transmitted from the UE 301 that is not registered in the local network. Alternatively, the DNS message handling rule may be used as a default DNS server address and may exist in the LDN. A structure in which the V-UPF 304 and the EASDF 312 may be collocated.

The NFs that provide functions for HR-SBO sessions in the home network 400 may include a UDM 409, an H-SMF 405, an H-UPF 404, an H-PCF 406, and a home DNS server 410. The H-PCF 406 may determine a policy for a home routed session. The H-PCF 406 may perform the function of storing and managing a roaming offloading policy for each VPLMN for the HR-SBO session for each VPLMN according to a service level agreement between operators of the HPLMN 400 and VPLMN 300. The roaming offloading policy for each VPLMN may include information for routing traffic to the local part of the DN 314 within the visited network 300, such as IP address range, domain address range, and QoS for the local part of the DN 314 and billing policy information (e.g., session AMBR information for the local part of the DN 314).

The UDM 409 may store a subscriber policy for session management according to a roaming agreement between the HPLMN 400 and the VPLMN 300 in advance. This subscriber policy may include a policy, such as whether to allow HR-SBO for each DNN/S-NSSAI of the UE 301, and roaming offloading policy for each VPLMN. The UDM 409 may transfer whether HR-SBO is allowed to the AMF 303 during registration through the visited network 300 of the UE 301. The UDM 409 may transfer whether to allow the HR-SBO to the AMF 303 during registration through the visited network 300 of the UE 301. This is separate from the local breakout (LBO) allowed indicator. When the LBO allowed is configured, the HR-SBO may be configured to not be allowed.

The H-SMF 405 may receive the SM-related subscriber information stored in the UDM 409 and finally determine whether to support an HR-SBO. When the H-SMF 405 allows the HR-SBO, the H-SMF 405 may transmit an HR-SBO use-allowed indicator. Additionally, the H-SMF 405 may configure the DNS server address of the PCO message transferred to the UE 301 to the V-EASDF address provided by the V-SMF 305. The home SMF 405 may transfer a billing collection request to the V-SMF 305 for billing collection. The V-SMF 305 may collect usage data from the UPF 404 through a user plane reporting rule.

The UE 301 may transmit and receive 5G control plane messages through the AMF 303 and the SMF 305. The UE 301 may access the EAS 314 through a PDU session through the UPF 304 through a user plane, may receive the DNS server address from the SMF 305, and may transfer the DNS query to the DNS server address.

Figure 4:
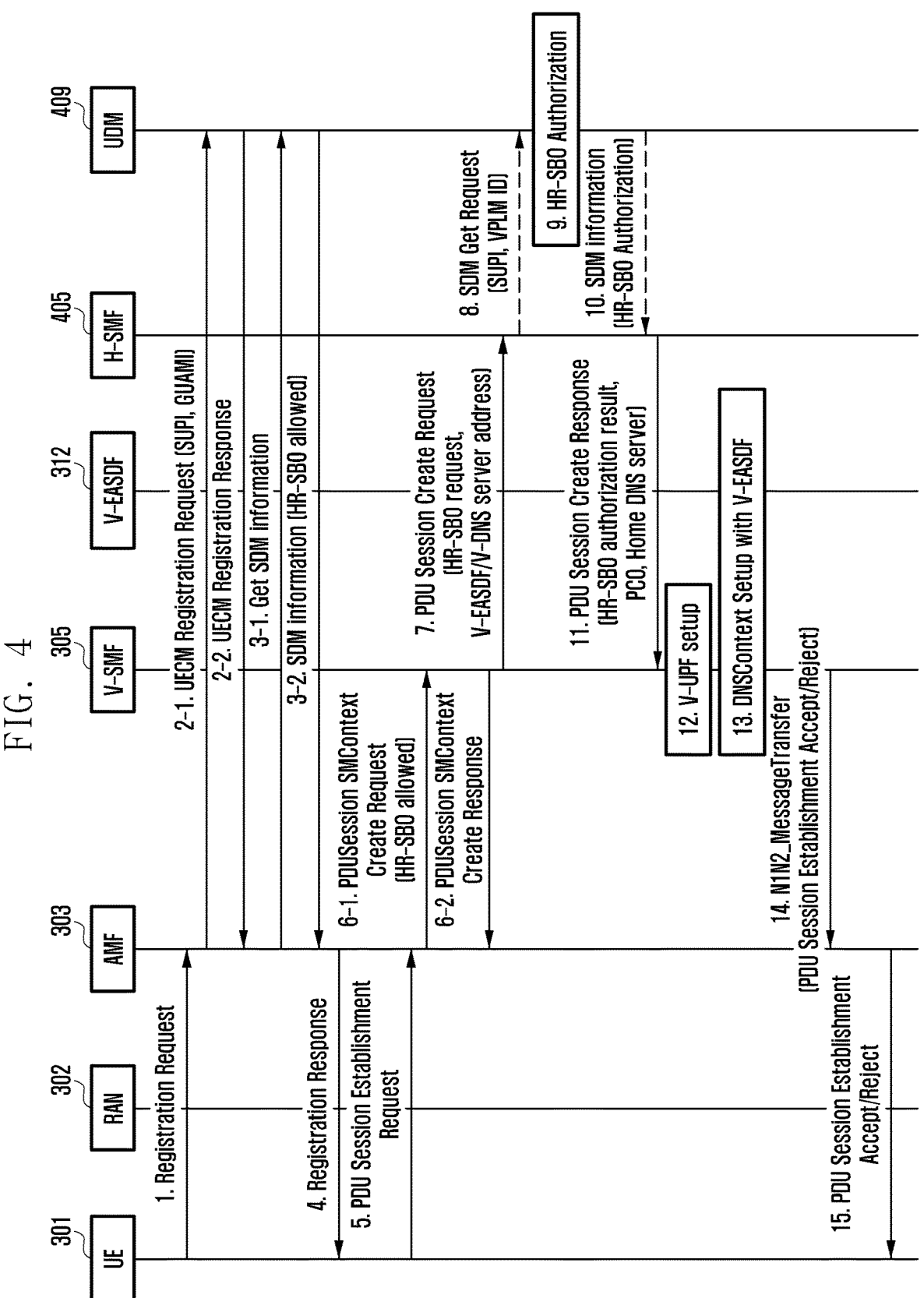
FIG. 4 illustrates a procedure for creating a home routing PDU session capable of session breakout in a wireless communication system according to an embodiment.

FIG. 4 illustrates a procedure for creating an HR-SBO session in a wireless communication system according to an embodiment.

In step 1, the UE 301 may initiate a registration procedure in a roaming area. For example, the UE 301 may transmit a registration request message to the AMF 303. The AMF 303 may receive the registration request message from the UE 301.

In step 2, the AMF 303 may perform a UECM Registration procedure with the UDM 409. In step 2-1, the AMF 303 may generate globally unique AMF identifier (GUAMI) information. The GUAMI information may include serving PLMN identifier information. The AMF 303 may identify the SUPI of the UE 301 and the AMF 303. The AMF 303 may register the GUAMI information that can identify the AMF 303, which includes serving network information, to the UDM 409. For example, the AMF 303 may transmit a UECM registration request message including the SUPI and GUAMI to the UDM 409. The AMF 303 may receive a UECM registration request message including the SUPI and GUAMI from the UDM 409.

In step 2-2, the AMF 303 may receive a UECM registration response message from the UDM 409.

In step 3-1, the AMF 303 may transmit, to the UDM 409, a message requesting SDM information about the HPLMN 300 of the UE 301. The AMF 303 may determine that the UE 301 is roaming. The AMF 303 may transmit an SDM request message including serving network information to the UDM 409 when the UE 301 is roaming. The AMF 303 may receive, from the UDM 409, different subscription information for each serving network, for example, HR-SBO policy related information or LBO related information among SMF selection information. Information configured in the UDM 409 may be configured in advance for each VPLMN according to the service level agreement (SLA) of the HPLMN 400 and VPLMN 300. The information configured for each VPLMN is shown below in Table 1, as is an example of HR-SBO related SMF selection information for each VPLMN.

TABLE 1

| SMF Selection Data (in UDM): UDM → AMF | | |
| --- | --- | --- |
| VPLMN ID | DNN, S-NSSAI | HR-SBO allowed |
| PLMN#1 | DNN#1, S-NSSAI#1 | N |
| | DNN#2, S-NSSAI#2 | N |
| PLMN#2 | DNN#1, S-NSSAI#1 | Y |
| | DNN#2, S-NSSAI#2 | N |

The UDM 409 of the home network 400 of the UE 301 may record whether LBO is allowed for each DNN and S-NSSAI pair of the UE 301 and subscriber information about whether session breakout is allowed (HR-SBO Allowed) in the visited network 300 according to a roaming agreement with the visited operator in advance, as UE-related subscriber information.

In step 3-2, the UDM 409 of the home network 400 may transmit, to the AMF 303, the subscriber information including whether a session breakout is allowed in the visited network 300 (HR-SBO allowed indicator) for the home routing session within the subscriber information of the UE 301 recorded in the UDR. The AMF 303 may receive SDM information including the HR-SBO allowed indicator from the UDM 409. The AMF 303 may record the SDM information in the context of the UE 301.

In step 4, the AMF 303 may transmit a registration response message in response to the registration request message requested by the UE 301, and may successfully complete the registration procedure for the UE 301. The UE 301 may receive a registration response message from the AMF 303.

In step 5, the UE 301 may transmit, to the AMF 303, URSP information received after a registration process, or a PDU session creation request message requesting the creation of a PDU session by local configuration in the UE or application request. The AMF 303 may receive the PDU session creation request message from the UE 301.

In step 6-1, the AMF 303 may transmit a PDU session SM context creation request message to the V-SMF 305. For example, the AMF 303 may confirm the subscriber information of the UE 301 and confirm whether HR-SBO and LBO are allowed for the DNN and S-NSSAI information requested by the UE 301. When LBO is allowed, the AMF 303 may determine LBO and select an SMF supporting it.

The AMF 303 selects the home routing session of the PDU session requested by the UE 301, and when it is a home routing session, the AMF 303 may confirm whether HR-SBO is allowed. When the session requested by the UE 301 is a home routing session and HR-SBO is allowed, the AMF 303 selects the V-SMF 305 that supports HR-SBO and transmit, to the V-SMF 305, information that can identify the H-SMF 405 for home routing (H-SMF identifier or H-SMF address) and an indicator indicating whether HR-SBO is allowed to the V-SMF 305. The AMF may be configured with an H-SMF identifier or H-SMF address for the UE's home operator network in advance.

The AMF 303 may transmit an SM context creation request (PDU Session CreateSMContext Request message) for creating a PDU session to the V-SMF 305 for a home routing session. When there is a visited SBO allowed indicator in the subscriber information of the home operator corresponding to the DNN and S-NSSAI included in the PDU session request message requested by the UE 301, the AMF 303 may determine to allow SBO for an HR session. When allowing SBO for an HR session, the AMF 303 may select the V-SMF 305 that provides the HR-SBO function by considering the DNN, S-NSSAI, HPLMN identifier, and UE subscription identifier. Additionally, the AMF 303 may select the H-SMF 405 that supports HR-SBO. The AMF 303 may select the V-SMF 305 and H-SMF 405 that provide the HR-SBO function by using its own preconfigured configuration information or by utilizing the function provided by the NRF. When determining to allow SBO for an HR session, the AMF 303 may transmit, to the selected V-SMF 305, a PDU session SM context creation request message including the UE subscription identifier, H-SMF address or identifier, HR-SBO allowed indicator, DNN, and S-NSSAI information. The PDU session SM context creation request message transmitted from the AMF 303 to the V-SMF 305 may include the address or identifier of the selected H-SMF 405.

The AMF 303 is a home routing session, but when HR-SBO is not allowed and when selecting the V-SMF, the AMF 303 may select the V-SMF that does not provide HR-SBO function, and may not transmit an HR-SBO allowed indicator to the V-SMF 305.

The V-SMF 305 may determine to create an HR session and provide a session breakout for the HR session, based on the HR-SBO allowed indicator included in the PDU Session SMContext creation request message received from the AMF 303 and the H-SMF information (i.e., H-SMF identifier or H-SMF address). The V-SMF 305 may not provide the session breakout function when the HR-SBO allowed indicator is not included in the PDU Session SMContext creation request message. Even when the V-SMF 305 receives the HR-SBO allowed indicator from the AMF 303, the V-SMF 305 may not provide session breakout when HR-SBO is unsupported, when ULCL/BP is unsupported, when adding/changing/deleting Local UPF in an area served by the V-SMF 305 is unsupported, when session breakout in an area where the UE 301 is currently located is unsupported, or when session breakout by the policy of the visited network 300 is unsupported.

In step 6-2, the V-SMF 305 may transmit a PDU session SM context creation response message to the AMF 303. The AMF 303 may receive the PDU session SM context creation response message from the V-SMF 305.

In step 7, if the V-SMF 305 determines to provide an HR session, the V-SMF 305 may transmit a PDU session creation request message to the H-SMF 405 corresponding to the H-SMF identifier or address received from the AMF 303. The PDU session creation request message may include an HR-SBO indicator. The HR-SBO request indicator transmitted from the V-SMF 305 to the H-SMF 405 may indicate that the V-SMF 305 may provide a session breakout function using ULCL/BP for the currently requested Home Routed PDU session.

When the V-SMF 305 does not support HR-SBO, the V-SMF 305 may not transmit the HR-SBO request indicator In step 7.

The Visited SMF 305 interworks with the V-EASDF 312, and may configure the address of the V-EASDF 312, which may be interworked with the V-SMF 305, as a DNS server address for the PDU session currently being created by the UE 301 to provide a session breakout function corresponding to the EAS discovered through the DNS message of the UE 301. For this purpose, the V-SMF 305 may transmit the address of the V-EASDF 312 to the H-SMF 405 (i.e., the DNS server address to be configured for the PDU session of the UE 301 by transmission to the UE 301 via the PCO. The DNS server address may be expressed as the N6 IP address of V-EASDF.

In order for the H-SMF 405 to configure the main address of the DNS server to be transmitted to the UE 301 as the address of the V-EASDF 312 through PCO information, the V-SMF 305 may include and transmit the N6 IP address of the selected V-EASDF 312 in the PDU session creation request message transmitted to the H-SMF 405. The N6 IP address of the V-EASDF 312 transmitted by the V-SMF 305 to the H-SMF 405 may be configured in advance for each PLMN, DNN, and S-NSSAI in the V-SMF 305.

Alternatively, to select the N6 IP address of the V-EASDF 312, the V-SMF 305 may transfer, to the V-EASDF 312, the DNN, S-NSSAI, and PLMN ID for the HR PDU session currently requesting creation, and may transmit a DNSContext creation request message to the V-EASDF 312. The V-SMF 305 may receive a response message to the DNSContext creation request message from the V-EASDF 312 and obtain the N6 IP address of the V-EASDF 312 included in the above message.

In step 8, the H-SMF 405 may transmit an SDM information request message to the UDM 409 to obtain subscriber information for the session. To receive information for each VPLMN in a roaming situation, the H-SMF 405 may transmit an SDM information request message including information about the currently serving VPLMN identifier. The UDM 409 may receive the SDM information request message from the H-SMF 405.

In step 9, the UDM 409 may authenticate the HR-SBO. For example, the UDM 409 may identify the PLMN ID information of the UE 301 based on GUAMI information, which is the identification information of the AMF 303, received from the AMF 303 of the VPLMN 300 In step 2. The UDM 409 identifies the serving network information (VPLMN ID) of the UE 301 based on the information included in the GUAMI or the VPLMN identifier information received from the H-SMF 405, and may identify HR-SBO allowed information and subscription information pre-configured for each VPLMN through the HPLMN 400 and SLA.

Table 2 below is an example of HR-SBO-related SM subscription information for each VPLMN. Table 2 shows session management subscription information that the UDM 409 receives a request from the H-SMF 405 and transfers to the H-SMF 405. The session management subscription information may include an indicator for whether HR-SBO is allowed for each DNN, S-NSSAI, or DNN for each VPLMN, when HR-SBO is allowed, offloading subscriber policy information for the VPLMN may be additionally included. The subscriber offloading policy information for each VPLMN may include traffic routing information about the local part of the DN within the VPLMN, which allows the VPLMN to route the traffic path from the UE 301 to the local part of the DN. For example, the subscriber offloading policy information for each VPLMN may include local traffic path configuration information such as IP address range, FQDN range, etc. Additionally, the subscriber offloading policy information for each VPLMN may additionally include information such as Session AMBR, which is subscriber information for the local part of the DN.

TABLE 2

| Session Management Subscription Data (in UDM) UDM → H-SMF | | | |
|---|---|---|---|
| VPLMN ID | DNN, S-NSSAI | HR-SBO authorization | VPLMN offloading policy |
| PLMN#1 | DNN#1, S-NSSAI#1 | N | |
| | DNN#2, S-NSSAI#2 | N | |

TABLE 2-continued

| Session Management Subscription Data (in UDM) UDM → H-SMF | | | |
|---|---|---|---|
| VPLMN ID | DNN, S-NSSAI | HR-SBO authorization | VPLMN offloading policy |
| PLMN#2 | DNN#1, S-NSSAI#1 | Y | IP range (1.2.3.4/24), FQDN range (*.abc.com) |
| | DNN#2, S-NSSAI#2 | N | |

In step 10, the UDM 409 may transmit an SDM information response message including HR-SBO authentication to the H-SMF 405. The H-SMF 405 may receive the SDM information response message including HR-SBO authentication from the UDM 409. The H-SMF 405 may identify whether HR Visited SBO is allowed based on the SM subscriber information received from the UDM 409 or the roaming agreement agreed upon with the subscriber's serving network. When the use of SBO provided by the visited network is allowed, and the H-SMF 405 receives a PDU session creation request including HR-SBO request, the H-SMF 405 may allow the address of the V-EASDF 312 transmitted by the Visited SMF 305 to be used as the DNS server address transmitted to the UE 301. The H-SMF 405 configures the address of the V-EASDF 312 as the DNS server address to be transmitted to the UE 301, configures the address of the V-EASDF 312 as the DNS address in a PCO field along with the PDU session allowed message and transmits the message to the UE 301.

In step 11, the H-SMF 405 may transmit a PDU session creation response message to the V-SMF 305. The V-SMF 305 may receive the PDU session creation response message from the H-SMF 405. The H-SMF 405 may transmit the result of the HR-SBO request to the V-SMF 305. For example, the PDU session creation response message may include HR-SBO authentication result, PCO, home DNS server address, and roaming offloading policy information for each VPLMN.

The HR-SBO session request of the V-SMF 305 is allowed by the H-SMF 405, and when the address of the V-EASDF 312 provided from the V-SMF 305 is configured to the PCO as the DNS server address of the UE 301, the UE 301 may transmit a DNS Query for the PDU session to the DNS server transferred to the PCO. In this case, since the DNS server address that has been intended to be used in the home network 400 is unused, the H-SMF 405 may transmit, to the V-SMF 305, the DNS server address of the home network 400 that has been intended to be used as the DNS server address of the UE 301.

In step 12, the V-SMF 305 may perform V-UPF setup. The V-SMF 305 may configure N9 tunnel information with the H-UPF 404 by transmitting the N4 rule to the V-UPF 304. The V-SMF 405 configures V-UPF when HR-SBO is allowed, and may configure the V-UPF 304 based on the rule that the DNS Query received from the UE 301 is routed to the V-EASDF 312.

In step 13, the V-SMF 305 may perform DNS context setup with the V-EASDF 312. For example, the V-SMF 305, which has received the DNS server address of the home network 400, may create a DNS message handling rule for transmission to the V-EASDF 312. The DNS message handling rule may be created for each EAS domain by the V-EASDF 312 using EAS Deployment Information. For example, the V-SMF 305 may create the DNS message handling rule that has configured the DNS server address of the home network 400 received from the H-SMF 405 as the default DNS server address. The V-SMF 305 may transmit the created DNS message handling rule to the V-EASDF 312.

The V-SMF 305 may additionally perform the following operations. The V-SMF 305 refers to whether HR-SBO is allowed from the AMF 303 for HR-SBO in steps 6-1 to 6-2 and whether the HR-SBO is allowed by the H-SMF 405 in step 11, and may determine whether to add ULCL/BP 304*a* and Local UPF 304*b* when providing the HR-SBO is determined. For example, the V-SMF 305 receives the HR-SBO allowed indicator from the AMF 303 in step 6-1, and if the conditions for adding the ULCP/BP 304*a* and Local UPF 304*b* are satisfied, a procedure for adding the ULCL/BP 304*a* and Local UPF 304*b* may be performed.

Alternatively, when the HR-SBO allowed indicator is received In step 6-1 from the AMF 303, the V-SMF 305 may determine providing HR-SBO without an HR-SBO approval procedure from the H-SMF 405.

Alternatively, the V-SMF 305 may determine to add the ULCL/BP 304*a* and Local UPF 304*b* through its own configuration according to the roaming agreement between the HPLMN 400 and an operator.

In step 14, the V-SMF 305 may transmit, to the AMF 303, an N1N2 message indicating approval or rejection of the PDU session establishment. The AMF 303 may receive the N1N2 message including PDU session establishment approval/rejection from the V-SMF 305. The V-SMF 305 may transmit, to the AMF 303, a PCO value in which the DNS server address included in the PCO value received from H-SMF 405 is configured to the EASDF server address.

In step 15, the AMF 303 may transmit the PDU session creation result (approval or rejection) received from the V-SMF 305 to the UE 301. The UE 301 may receive the PDU session creation result (approval or rejection) from the AMF 303.

FIG. 5 illustrates a scenario for changing the HR to HR-SBO session when moving Inter-PLMN in a wireless communication system according to an embodiment.

In FIG. 5, a scenario is illustrated in which after creating an HR session that does not support HR-SBO when the UE 301, a subscriber of the HPLMN 400, registers VPLMN#1 300-1 as a serving PLMN, inter-PLMN mobility occurs from VPLMN#1 300-1 to VPLMN#2 (300-2), the UE 301 is registered in VPLMN#2 300-2, and a previously created HR session is changed to an HR-SBO session.

For reference, a case where the UE 301 is connected from VPLMN#1 300-1 and an HR session in which HR-SBO is not supported is created may be when HR-SBO is not allowed in VPLMN#1 300-1 by HPLMN's subscriber policy, when HR-SBO is allowed to use HR-SBO in VPLMN#1 300-1 according to HPLMN policy (HR-SBO session is not created when there is no V-SMF in available VPLMN#1 300-1), when HR-SBO is allowed to use HR-SBO in VPLMN#1 300-1 according to HPLMN policy (HR-SBO session is not created when there is no V-SMF of VPLMNE1 available), and when HR-SBO is allowed to use HR-SBO in VPLMN#1 300-1 according to HPLMN policy (HR-SBO session is not created when H-SMF that supports HR-SBO is not selected by AMF of VPLMN#1 300-1).

The UE 301 can perform inter-PLMN mobility and change to VPLMN#2 300-2 and change the session to HR-SBO when the use of HR-SBO is allowed for VPLMN#2 300-2 according to the subscriber policy of HPLMN 400, the VPLMN#2 300-2 provides the HR-SBO function, the AMF selected V-SMF, which supports HR- SBO, and the previously created HR session is an H-SMF that supports HR-SBO and an H-SMF that provides a V-SMF change function.

Figure 6:
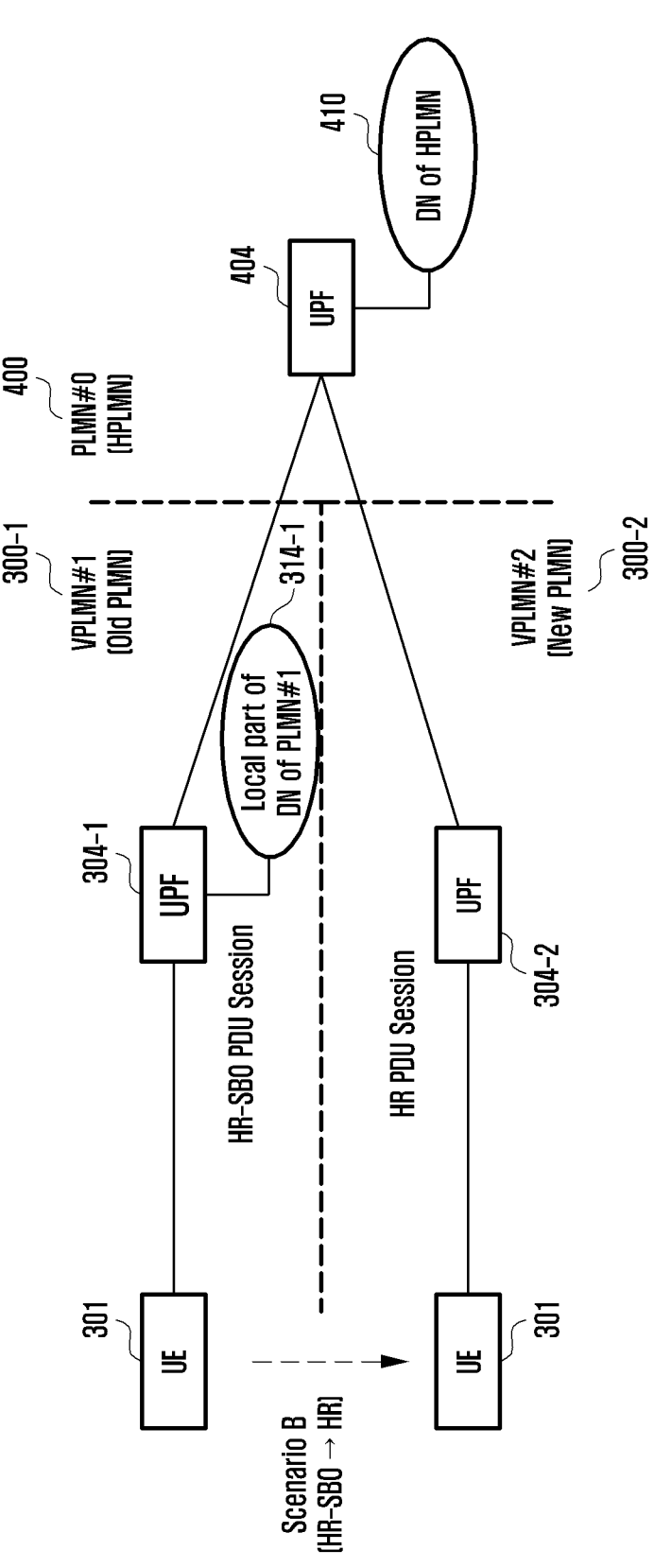
FIG. 6 illustrates Inter-PLMN movement scenario B for an HR-SBO session (HR-SBO→HR) in a wireless communication system according to an embodiment.

FIG. 6 illustrates a scenario for changing the HR-SBO to HR session when moving Inter-PLMN in a wireless communication system according to an embodiment.

In FIG. 6, a scenario is illustrated in which after creating an HR-SBO session that supports HR-SBO when the UE 301, a subscriber of the HPLMN 400, registers VPLMN#1 300-1 as a serving PLMN, inter-PLMN mobility occurs from VPLMN#1 300-1 to VPLMN#2 (300-2), and the UE 301 is registered in VPLMN#2 300-2 and a previously created HR-SBO session is changed to an HR session.

For reference, a case where the UE 301 is connected from VPLMN#1 300-1 and creates an HR-SBO session that supports HR-SBO may be when HR-SBO is allowed to be used in VPLMN#1 300-1 according to the policy of HPLMN 400, and when the AMF of VPLMN#1 300-1 selects V-SMF, which provides the HR-SBO function available in VPLMN#1 300-1, and H-SMF, which provides HR-SBO in HPLMN.

The UE 301 can perform inter-PLMN mobility and change to VPLMN#2 300-2 and change the session to HR when the use of HR-SBO is not allowed in VPLMN#2 300-2 due to the subscriber policy of HPLMN 400, VPLMN#2 300-2 does not provide an HR-SBO function, and the H-SMF that created a previously created HR-SBO session provides a V-SMF change function.

Figure 7:
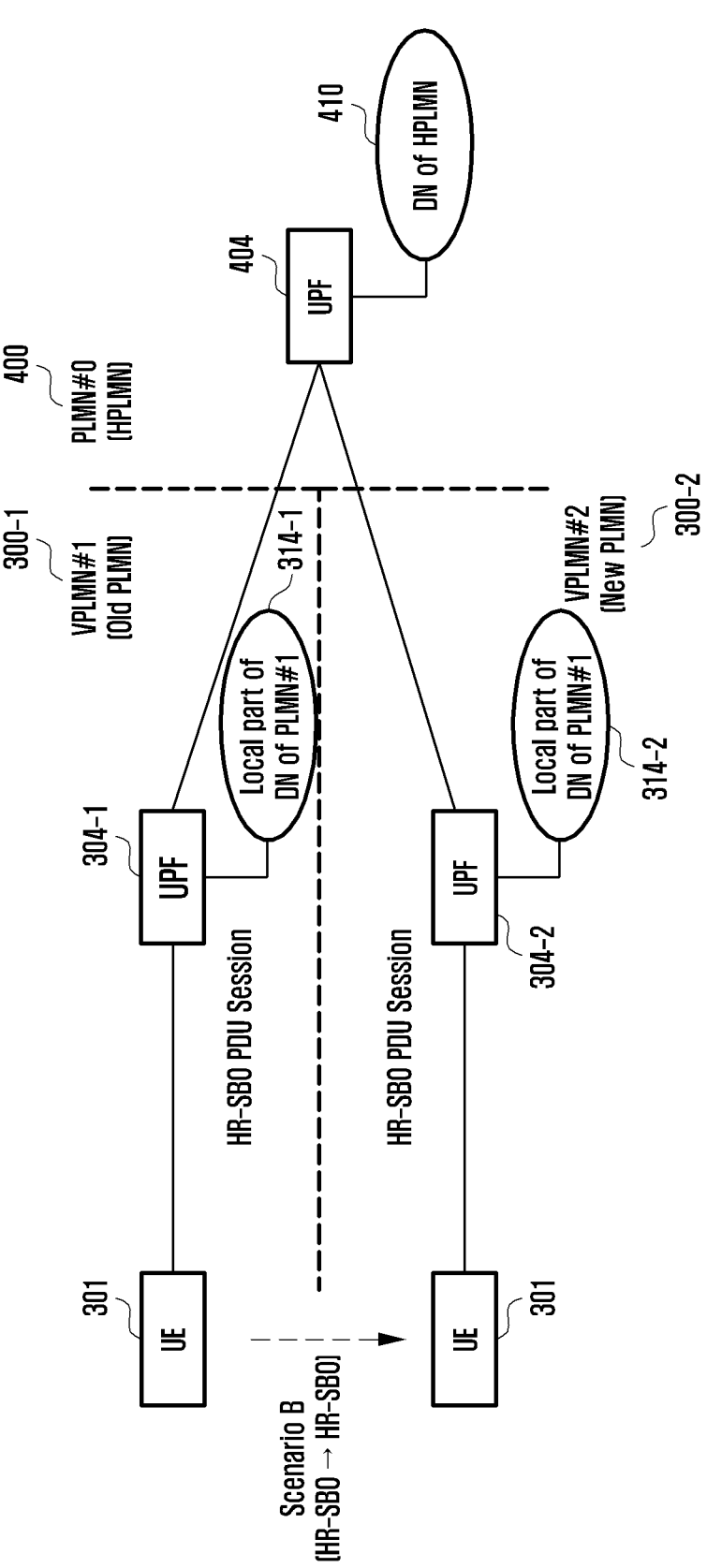
FIG. 7 illustrates Inter-PLMN movement scenario C for an HR-SBO session (HR-SBO→HR-SBO) in a wireless communication system according to an embodiment.

FIG. 7 illustrates a scenario for changing the HR-SBO to HR-SBO session when moving Inter-PLMN in a wireless communication system according to an embodiment.

In FIG. 7, a scenario is illustrated in which after creating an HR-SBO session that supports HR-SBO in VPLMN#1 (300-1) when the UE 301, a subscriber of the HPLMN 400, registers VPLMN#1 300-1 as a serving PLMN, inter-PLMN mobility occurs from VPLMN#1 300-1 to VPLMN#2 (300-2), and the UE 301 is registered in VPLMN#2 300-2 and a VPLMN specific roaming policy for a previously created HR-SBO session is updated to a policy for VPLMN#2 300-2.

A scenario for inter-PLMN handover related to a home routing session is described. When the UE 301 performs Inter-PLMN HO after creating an HR session or HR-SBO session in a roaming situation, the following four scenarios may exist for updating the created HR session. Table 3 below illustrates inter-PLMN mobility scenarios related to home routing sessions.

TABLE 3

| Scenario | OLD VPLMN | NEW VPLMN |
|---|---|---|
| HR to HR | HR-SBO not supported | HR-SBO not supported |
| A. HR to HR-SBO | HR-SBO not supported | HR-SBO supported |
| B. HR-SBO to HR | HR-SBO supported | HR-SBO not supported |
| C. HR-SBO to HR-SBO | HR-SBO supported | HR-SBO supported |

Figure 8A:
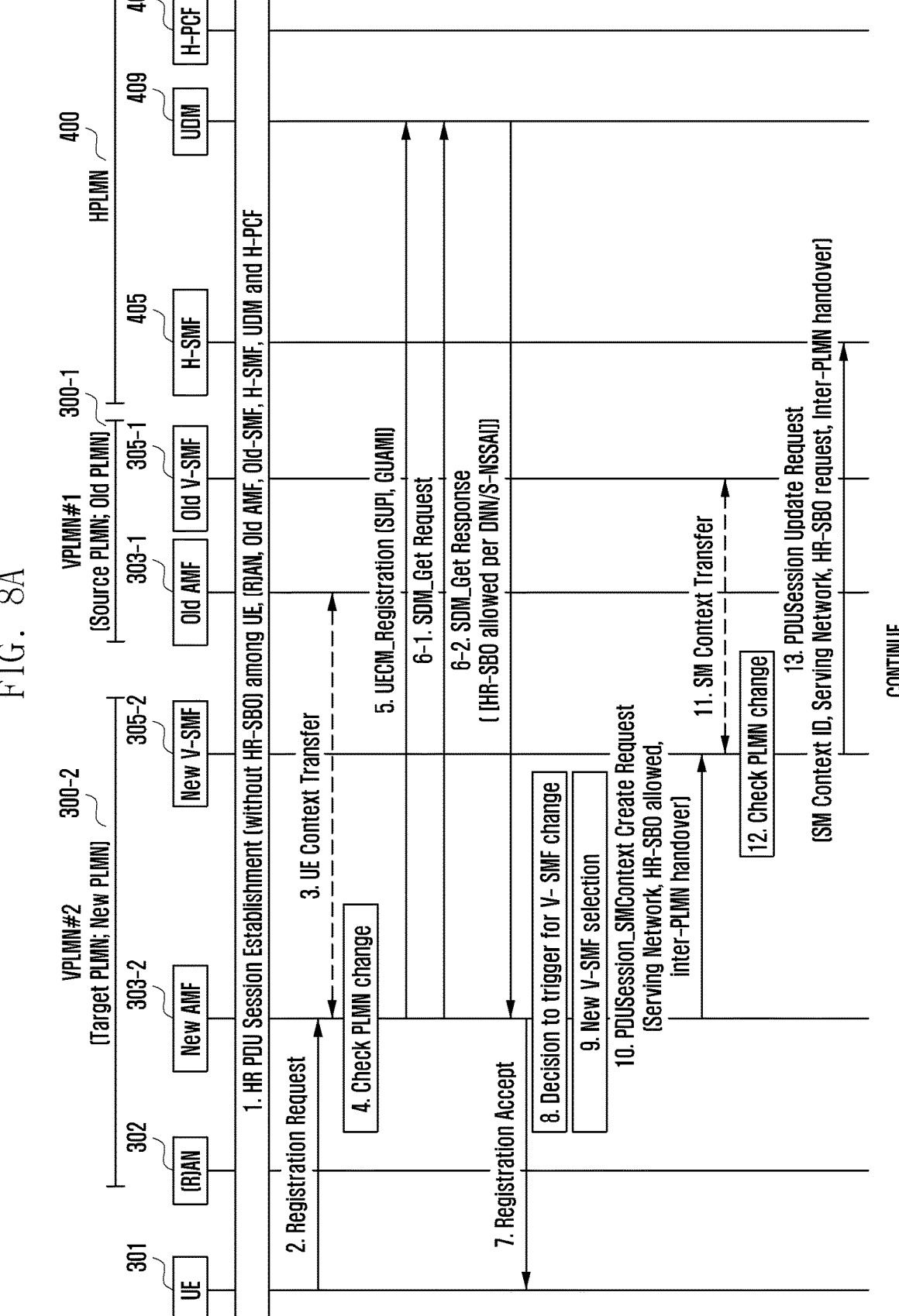

FIGS. 8A and 8B illustrate an HR-SBO session change procedure according to movement between PLMNs in a wireless communication system according to an embodiment.

In step 1, the UE 301 may perform a home routed PDU session creation procedure with an old AMF 303-1, an old V-SMF 305-1, an H-SMF 405, an H-PCF 406, and the like.

In step 2, the UE 301 may transmit a registration request message to the new AMF 303-2 through the BS 302. The new AMF 303-2 may receive a registration request message from the UE 301 through the BS 302.

In step 3, the new AMF 303-2 confirms the 5G GUTI information included in the registration request message, identifies the old AMF 303-1 from the 5G GUTI information, and then requests the old AMF 303-1 to obtain the context of the UE 301.

In step 4, the new AMF 303-2 may detect inter-PLMN mobility by determining a PLMN change. The new AMF 303-2 may identify the 5G-GUTI included in the registration request message received in step 1 and the selected PLMN or selected PLMN ID and NID information included in the N2 Parameter received from the NG-RAN 302. The new AMF 303-2 may identify the old AMF 303-1 and old serving PLMN 300-1 from the 5G-GUTI information of the registration request message. The new AMF 303-2 may determine inter-PLMN mobility through the identified old PLMN ID and selected PLMN ID information. For example, the new AMF 303-2 may identify old PLMN ID information from MNC and MCC information extracted from 5G-GUTI, and may identify information on the PLMN currently connected to the UE 301 from the selected PLMN information included in N2 parameter received from the NG-RAN 302. When the values corresponding to the two pieces of information are different from each other, the new AMF 303-2 may determine the Inter-PLMN HO.

In step 5, when the new AMF 303-2 detects that the PLMN has changed, it can generate GUAMI information and transmit a registration message to register UE context information to the UDM 409. The registered UE context information may include GUAMI information that may identify the serving PLMN information of the new AMF 303-2 and UE 301. The UDM 409 may identify the serving PLMN information currently registered by the UE 301 through the GUAMI information registered by the new AMF 303-2.

In step 6, when the new AMF 303-2 supports inter-PLMN mobility In step 2, the new AMF 303-2 may transmit an SDM Get request message to the UDM 409 to receive different SMF selection information for each VPLMN. In the case of inter-PLMN mobility, the new AMF 303-2 may transmit an SDM Get message including a VPLMN identifier or information indicating inter-PLMN mobility to the UDM 409 to obtain information about the newly connected VPLMN 300-2. The new AMF 303-2 may receive subscriber information about the UE 301.

Alternatively, the new AMF 303-2 may receive information corresponding to the VPLMN 300-2 to which the UE 301 is currently connected from the UDM 409 among the subscriber information for the UE 301. Subscriber information for each VPLMN may include SMF selection information necessary for the new AMF 303-2 to select an SMF. The SMF selection information may be classified by DNN, S-NSSAI, or DNN, and the SMF selection information may include information about whether HR-SBO is allowed or whether LBO is supported. The new AMF 303-2 may identify the received SMF selection information. The UDM 409, which has received the SDM Get request from the new AMF 303-2 in step 6, may identify the serving network information to which the UE 301 is currently connected. The UDM 409 may identify the information about the serving network currently connected to the UE 301 through the MCC and MNC information included in the GUAMI information received in step 5, or may identify the information about the serving network through the PLMN ID information included in the UDM Get message. The UDM 409 may identify SMF selection information for each VPLMN corresponding to the serving network connected to the UE 301 in the database and transmit the corresponding SMF selection information to the new AMF 303-2. The SMF selection information transmitted from the UDM 409 to the new AMF 303-2 may be the information shown in Table 1 described in step 3 of FIG. 4.

In step 7, the new AMF 303-2 may transmit a registration acceptance message to the UE 301.

In step 8, the new AMF 303-2 may receive UE context information, whether there is inter-PLMN mobility, and subscriber information of the UDM 409 from the old AMF 303-1 and trigger a procedure to change V-SMF. The new AMF 303-2 may request the NRF to select the H-SMF and perform a discovery procedure for the H-SMF. The new AMF 303-2 may obtain information on whether H-SMF 405 supports V-SMF change and whether the H-SMF 405 supports HR-SBO through a discovery operation through NRF to select H-SMF.

The new AMF 303-2 may detect that an inter-PLMN mobility has occurred and, when the H-SMF 405 supports V-SMF change, the new AMF 303-2 may determine to initiate a V-SMF change procedure for the home routing PDU session. When the H-SMF 405 does not support V-SMF change, the new AMF 303-2 may determine to release the HR PDU session.

The new AMF 303-2 detects inter-PLMN mobility, HR-SBO is allowed for the network corresponding to the currently created PDU session, the H-SMF 405 supports HR-SBO. When the V-SMF providing HR-SBO is available for selection, a procedure for changing the V-SMF may be performed.

When the previously created PDU session supports SSC Mode 2 or SSC Mode 3, but does not support HR-SBO, and supports HR-SBO in the current VPLMN 300-2 (i.e., a case where selection of a V-SMF supporting HR-SBO is possible in the new AMF 303-2), the new AMF 303-2 may report the Inter-PLMN HO to an existing V-SMF 305-1 without assigning a new V-SMF 305-2. The old V-SMF 305-1, which has received a report of inter-PLMN mobility from the new AMF 303-2, may initiate the SSC Mode 2 or SSC Mode 3 procedure for the HR PDU session of the UE that has performed inter-PLMN mobility.

When the new AMF 303-2 in step 9 determines to add the new V-SMF 305-2 in step 8, the new AMF 303-2 may select the new V-SMF 305-2 that supports HR-SBO. The new AMF 303-2 may identify whether a session for DNN and S-NSSAI for which HR-SBO is allowed included in SMF selection information has already been created in the UE context information received from the old AMF 303-1. When a session corresponding to the DNN and S-NSSAI included in the SMF selection information received in step 6 has already been created, and there is an HR-SBO allowed indicator in the SMF selection information, the new AMF 303-2 may select the new V-SMF 305-2 that supports HR-SBO.

In step 10, the new AMF 303-2 may transmit a PDUSession_SMContext Create request message to the new V-SMF 305-2. After the new AMF 303-2 selects the new V-SMF 305-2, the PDUSession_CreateSMContex request message transmitted to change the V-SMF may include current serving network information (i.e., PLMN ID or PLMN ID and NDI), Inter-PLMN event occurrence information, old SMF ID and SM Context ID information in the old SMF, DNN, S-NSSAI information, mapping information of S-NSSAI, PDU Session ID, and an H-SMF identifier. When the SMF selection information received by the new AMF 303-2 from the UDM 409 includes an HR-SBO allowed indicator corresponding to DNN and S-NSSAI, the New AMF 303-2 may transmit a request message including the HR-SBO allowed indicator to the new V-SMF 305-2.

In step 11, the new V-SMF 305-2 receives the PDUSession_CreateSMContext request message from the new AMF 303-2 in step 10, and when the old SMF ID and SMContext ID in OLD SMF 305-2 are included in the message, a message requesting SMContext may be transmitted to the old SMF 305-2 to receive the session context for the PDU session of the UE 301 stored from the old V-SMF 305-2.

In step 12, the new V-SMF 305-2 may determine whether the request for creating a new SMContext is a request based on inter-PLMN mobility. The new V-SMF 305-2 may determine whether the request for creating a new SMContext is a request based on inter-PLMN mobility based on the indicator indicating inter-PLMN mobility in the message received in step 10. Alternatively, the new V-SMF 305-2 may compare the information about the serving network included in step 10 with the serving network information included in the SM context information received from the old SMF 305-2 in step 11 to determine inter-PLMN mobility.

In step 13, the new V-SMF 305-2 may transmit a PDUSession Update request message to the H-SMF 405. The PDUSession Update request message may include serving network information (PLMN ID or PLMN ID and NDI information), information indicating inter-PLMN mobility event (inter-PLMN mobility), and HR-SBO related update request information. Depending on the scenario described in FIGS. 5, 6, and 7, the HR-SBO-related update request information may include one of HR-SBO new request information (scenario A illustrated in FIG. 5), HR-SBO release request information (scenario B illustrated in FIG. 6), and HR-SBO update request information (scenario C illustrated in FIG. 7).

In step 14, the H-SMF 405 may receive a PDUSession update request message from the new V-SMF 305-2 and determine inter-PLMN mobility.

The H-SMF 405 may determine inter-PLMN mobility. The method for the H-SMF 405 to determine inter-PLMN mobility may be as follows.

When the message received in step 13 explicitly includes information indicating inter-PLMN mobility, the H-SMF 405 may determine inter-PLMN mobility. When the message received in step 13 includes a serving network, the H-SMF 405 may determine inter-PLMN mobility. When the serving network is included in the message received in step 13 and is different from the serving network included in the SM context stored in the H-SMF, the H-SMF 405 may determine inter-PLMN mobility.

In step 15, when the H-SMF 405 determines that the PLMN has moved, the H-SMF 405 may transmit an SDM request to the UDM 409 to confirm subscriber information on whether or not the changed HR-SBO is allowed due to the PLMN change. The H-SMF 405 may transmit an SDM request including a requester requesting HR-SBO information and a VPLMN identifier to the UDM 409 to confirm HR-SBO information for the VPLMN.

In step 16, the UDM 409 may confirm the SM subscription information to confirm whether HR-SBO is allowed in the serving PLMN of the UE 301. To confirm the serving network of the UE 301, the UDM 409 may confirm the GUAMI information included in the UECM registration message received from the new AMF 303-2 in step 5 to identify the current serving network of the UE 301, and confirm SM subscription data corresponding to the serving network of the UE 301 to determine whether the current session allows HR-SBO. The UDM 409 may confirm the serving network information (VPLMN ID) of the UE 301 through the information included in the GUAMI, and may confirm HR-SBO allowed information and subscription information preconfigured for each VPLMN through the HPLMN 400 and SLA. Alternatively, the UDM 409 may confirm home-routed with session breakout (HR-SBO) allowed information for the VPLMN and VPLMN-related offloading information (e.g., IP address range, QDN range, aggregate maximum bit rate (AMBR) information for a local DN) based on the VPLMN identifier information received from the H-SMF 405.

In step 17, the UDM 409 may receive the SDM subscription request from the H-SMF 405, confirm the serving network, and then transmit session management subscription information for each VPLMN as illustrated in Table 2 to the H-SMF 405. The UDM 409 may transmit, to the H-SMF 405, an SDM Get response message including an indicator as to whether HR-SBO is allowed for DNN for each VPLMN, S-NSSAI, or DNN. When HR-SBO is allowed, the UDM 409 may transmit the SDM Get response message including additional offloading subscriber policy information for the VPLMN to the H-SMF 405. The subscriber offloading policy information for each VPLMN may include traffic routing information for the local part of the DN within the VPLMN that allows the VPLMN to route traffic path from the UE 301 to the local part of DN, for example local traffic path configuration information such as IP address range and FQDN range. The subscriber offloading policy information for each VPLMN may include QOS rules for the local part of DN, including session aggregate maximum bit rate (AMBR), which is subscriber information for the local part of DN, and a PCC rule that the H-SMF 405 creates N4 rules, which are user plane configuration information.

In step 18, according to the HR-SBO approved result received from the UDM 409, the H-SMF 405 may transmit VPLMN ID and Inter-PLMN HO occurrence event to receive roaming offloading policy information for each VPLMN for the current serving PLMN from the H-PCF 406, when the HR session is changed to a session supporting HR-SBO (scenario A) or the VPLMN is changed even when the session supporting HR-SBO continues to be a session supporting HR-SBO. Alternatively, when an Inter-PLMN HO event is received from the new V-SMF 305-2, the PLMN change may be reported to the H-PCF 406.

In step 19, when the H-PCF 406 receives the VPLMN Id and the roaming offloading policy request for each VPLMN from the H-SMF 405, the H-PCF 406 may transmit the offloading policy for the VPLMN to the H-SMF 405.

In step 20, the H-SMF 405 may transmit a PDUSession update response message to the new V-SMF 305-2. The PDUSession update response message may include the approved result for the HR-SBO request and VPLMN specific offloading policy information received from the UDM 409 or H-PCF 406.

The H-SMF 406 may transmit, to the new V-SMF 305-2, the results of the following HR-SBO related requests to the new V-SMF 305-2 according to the information received from the UDM 409 and the request of the new V-SMF 305-2.

When the request received from the new V-SMF 305-2 is HR-SBO new request information (HR to HR-SBO upgrade request according to scenario A), and the corresponding SM subscription information is approved for the requested VPLMN, the H-SMF 405 may determine an approval for the use request through the HR-SBO session.

When the request from the new V-SMF 305-2 is HR-SBO release request information (HR-SBO to HR according to scenario B), and the corresponding SM subscription information is not approved for the current VPLMN, or regardless of whether it is approved, the H-SMF 405 may determine that HR-SBO is not approved. In this case, the H-SMF 405 may transmit a result that HR-SBO has been revoked to the new V-SMF 305-2.

When the request from the new V-SMF 305-2 is HR-SBO update request information (HR-SBO to HR-SBO according to scenario C), and the corresponding SM subscription information is approved for the current VPLMN to which the UE 301 is connected, the H-SMF 405 may determine to continue using the HR-SBO session and transmit the changed VPLMN specific policy to the new V-SMF 305-2.

In step 21, when the new V-SMF 305-2 receives an approval for HR-SBO from the H-SMF 405, that is, when the new V-SMF 305-2 receives a response corresponding to scenario A or scenario C, an N4 configuration for V-UPF as described In step 12 of FIG. 4 may be performed.

In step 22, when the new V-SMF 305-2 receives an approval for HR-SBO from the H-SMF 405, that is, when it receives a response against scenario A or scenario C, the V-SMF 305-2 may perform a DNS context configuration procedure for transmitting a DNS handling rule to the V-EASDF 312, as In step 13 of FIG. 4.

In step 23, the V-SMF 305-2 may transmit a PDUSession_CMContext Create response message to the AMF 303-2.

Figure 9:
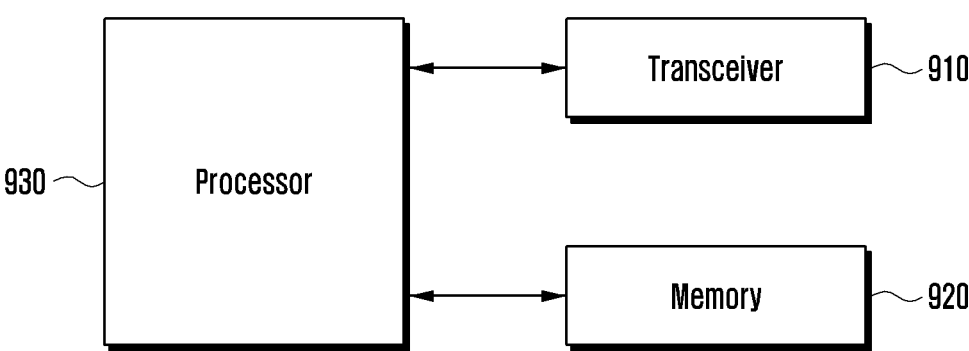
FIG. 9 illustrates a terminal in a wireless communication system according to an embodiment.

FIG. 9 illustrates a UE 900 in a wireless communication system according to an embodiment.

In FIG. 9, a UE 900 may include a transceiver 910, a memory 920 and a processor 930. The UE 900 may be the same as or similar to the UE 101 in FIG. 1, the UE 201 in FIG. 2, and the UE 301 in FIGS. 3 to 8.

The processor 930, transceiver 910 and memory 920 of the UE 900 may operate according to an operation method of the UE 900. The components of the UE 900 are not limited to FIG. 9. For example, the UE 900 may include more or fewer components than the components of FIG. 9. The processor 930, the transceiver 910, and the memory 920 may be implemented in the form of a single chip.

The transceiver 910 may collectively refer to a receiver and a transmitter of the UE 900 and may transmit/receive signals to/from a BS or a network entity. The signals transmitted/received to/from the BS may include control information and data. For this purpose, the transceiver 910 may include a radio frequency (RF) transmitter for up-converting and amplifying a frequency of a transmitted signal and an RF receiver for low-noise-amplifying and down-converting a frequency of a received signal. However, this is merely an embodiment of the transceiver 910, and the components of the transceiver 910 are not limited to the RF transmitter and the RF receiver. For example, the transceiver 910 may include a power amplifier 10, a wired/wireless transceiver, and various configurations for transmitting and receiving signals.

The transceiver 910 may receive a signal through a radio channel and output the signal to the processor 930 and may transmit a signal output from the processor 930, through a radio channel.

The transceiver 910 may receive and output a communication signal to the processor, and may transmit a signal output from the processor 930 to the network entity via a wired/wireless network.

The memory 920 may store programs and data required for the UE 900 to operate and may store control information or data included in a signal obtained by the UE 900. The memory 920 may include a storage medium such as ROM, RAM, a hard disk, a CD-ROM, a DVD, or a combination thereof.

The processor 930 may control a series of processes to allow the UE 900 to operate according to the above-described embodiments and may include one or more processors. For example, the processor 930 may include a communication processor (CP) for controlling communications and an application processor (AP) for controlling a higher layer such as an application program.

Figure 10:
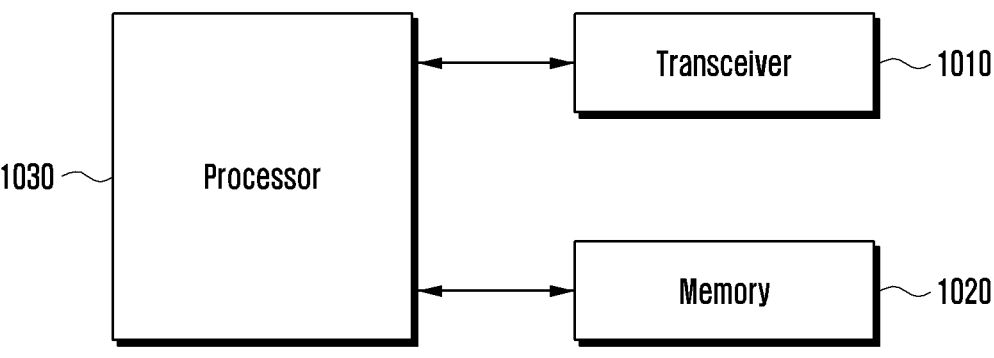
FIG. 10 illustrates a base station (BS) in a wireless communication system according to an embodiment.

The UE 900 may be at least one of various types of communication nodes, such as a terminal, a BS, or at least one of various network entities used in various communication systems. FIG. 10 illustrates a BS 1000 in a wireless communication system according to an embodiment.

In FIG. 10, the BS 1000 may be at least one of the (R)AN 102 of FIG. 1, the (R)AN 202 of FIG. 2, and the RAN 302 of FIGS. 3 to 8.

The BS 1000 may include a processor 1030 that controls the overall operation of the BS 1000, a transceiver 1010 including a transmitter and a receiver, and a memory 1020. The BS is not limited to the above example, and the BS 1000 may include more or fewer components than the components illustrated in FIG. 10.

The transceiver 1010 may transmit and receive signals with at least one of the network entities 1100 and UE 900. The signal transmitted and received with at least one of the network entities 1100 and UE 900 may include control information and data.

The processor 1030 may control the BS 1000 such that the BS 1000 performs the above-described operations of FIGS. 1 to 8. The processor 1030, the memory 1020, and the transceiver 1010 are not necessarily to be implemented as separate modules but may also be implemented as a single component, for example, in the form of a single chip. The processor 1030 and the transceiver 1010 may be electrically connected to each other.

The memory 1020 may store data such as a basic program for operation of the BS 1000, an application program, configuration information, or the like. In particular, the memory 1020 provides stored data according to a request from the processor 1030 and may include a storage medium, such as ROM, RAM, a hard disk, CD-ROM, or DVD, or a combination thereof. The memory 1020 may be included by a plural number. The processor 1030 may execute the above-described embodiments based on a program stored in the memory 1020, the program being designed to perform the above-described embodiments.

Figure 11:
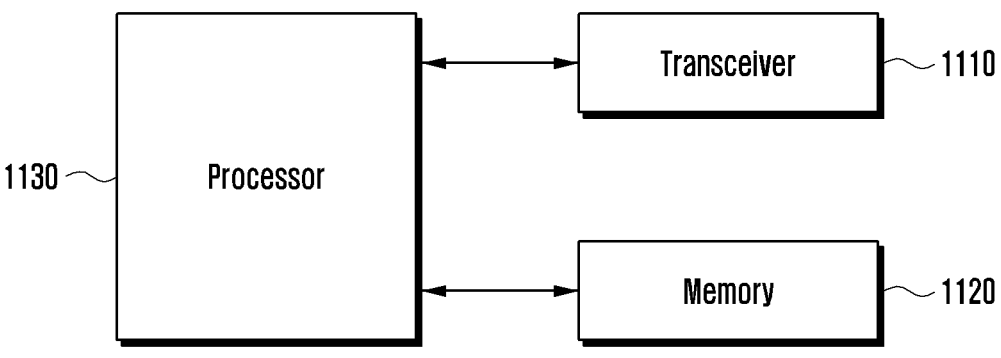
FIG. 11 illustrates a network entity in a wireless communication system according to an embodiment.

FIG. 11 illustrates a network entity 1100 in a wireless communication system according to an embodiment.

In FIG. 11, the network entity 1100 may be at least one of the AMF 103, UPF 104, SMF 105, PCF 106, AF 107, AUSF 108, UDM 109, NEF 111, EASDF 112, DNS 113, EAS 114 of FIG. 1, the AMF 203, UPF 204, SMF 205, PCF 206, AF 207, AUSF 208, UDM 209, NEF 211, EASDF 212, NSSF 214, NRF 215 of FIG. 2, and the AMF 303, 303-1, 303-2, UPF 304, 304-1, 304-2, SMF 305, 305-1, 305-2, PCF 306, AF 307, EAS 314, NRF 315, UPF 404, H-SMF 405, PCF 406, and UDM 409 of FIGS. 3 to 8.

The network entity 1100 may include a processor 1130 controlling overall operations of the network entity 1100, a transceiver 1100 including a transmitter and a receiver, and a memory 1120. The network entity 1100 is not limited to the above example and may include more or fewer components than those illustrated in FIG. 11.

The transceiver 1110 may transmit and receive signals with at least one of other network entities 1100, UE 900 and BS 1000. The signal transmitted and received with at least one of other network entities, UE 900 and BS 1000 may include control information and data.

The processor 1130 may control the network entity 1100 such that the network entity 1100 performs the above-described operations of FIGS. 1 to 8. The processor 1130, the memory 1120, and the transceiver 1110 are not necessarily to be implemented as separate modules but may also be implemented as a single component, for example, in the form of a single chip. The processor 1130 and the transceiver 1110 may be electrically connected to each other.

The memory 1120 may store data such as a basic program for operation of the network entity 1100, an application program, configuration information, or the like. In particular, the memory 1120 provides stored data according to a request from the processor 1130. The memory 1120 may include a storage medium, such as at least one of a ROM, RAM, a hard disk, CD-ROM, or DVD. The processor 1130 may execute the above-described embodiments based on a program stored in the memory 1120, the program being designed to perform the above-described embodiments.

Methods described herein may be implemented in hardware, software, or a combination of hardware and software.

When implemented as software, a computer-readable storage medium storing one or more programs (e.g., software modules) may be provided. The one or more programs stored in the computer-readable storage medium are configured to be executable by one or more processors in an electronic device. The one or more programs include instructions causing the electronic device to execute the methods according to embodiments of the disclosure.

The programs (e.g., software modules or software) may be stored in random access memory, non-volatile memory including flash memory, read only memory (ROM), electrically erasable programmable read-only memory (EEPROM), a magnetic disc storage device, compact Disc-ROM (CD-ROM), a digital versatile disc (DVD), another type of optical storage device, or a magnetic cassette. Alternatively, the programs may be stored in a memory including a combination of some or all of the above-mentioned memory devices.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus performing the embodiments of an embodiment; Another storage device on the communication network may also be connected to the apparatus performing the embodiments herein.

While this disclosure has been illustrated and described with reference to various embodiments of the present disclosure, those skilled in the art will understand that various changes can be made in form and detail without departing from the spirit and scope of the present disclosure as defined by the appended claims and their equivalents.

What is claimed is:

1. A method performed by a visited-session management function (V-SMF) in a visited public land mobile network (VPLMN), the method comprising:

receiving, from an access and mobility management function (AMF) in the VPLMN, a protocol data unit (PDU) session create request message including an indicator for allowing home-routed session breakout (HR-SBO) and an identifier (ID) of the VPLMN after an inter-public land mobile network (PLMN) handover is performed;

transmitting, to a home-SMF (H-SMF) in a home PLMN (HPLMN), a PDU session update request message including the ID of the VPLMN and an HR-SBO request message; and receiving, from the H-SMF, a PDU session update response message including an authorization result for the HR-SBO.

2. The method of claim 1, wherein the ID of the VPLMN indicates a handover from a source VPLMN to the VPLMN, and wherein the HR-SBO is unsupported in the VPLMN.

3. The method of claim 1, wherein the AMF receives SMF selection data including the indicator for allowing the HR-SBO from a unified data management (UDM).

4. The method of claim 1, further comprising: identifying a PLMN change based on the ID of the VPLMN.

5. A method performed by a home-session management function (H-SMF) in a home public land mobile network (HPLMN), the method comprising:

receiving, from a visited-SMF (V-SMF) in a visited public land mobile network (VPLMN), a protocol data unit (PDU) session update message including a home-routed session breakout (HR-SBO) request message and an identifier (ID) of the VPLMN after an inter-PLMN handover is performed;

transmitting, to a unified data management (UDM), a subscriber data management (SDM) request message;

receiving, from the UDM, an SDM response message including an authorization result for the HR-SBO; and transmitting, to the V-SMF, a PDU session update response message including an authorization result for the HR-SBO.

6. The method of claim 5, further comprising:

transmitting, to a home-policy control function (H-PCF), a session management (SM) policy control update request message including an HR-SBO policy; and receiving, from the H-PCF, an offloading policy for the VPLMN.

7. The method of claim 5, wherein the UDM identifies whether the HR-SBO is allowed for the VPLMN based on an identity of an AMF.

8. The method of claim 5, further comprising: identifying a PLMN change based on the ID of the VPLMN.

9. A visited-session management function (V-SMF) in a visited public land mobile network (VPLMN), the V-SMF comprising:

a transceiver; and a controller configured to:

receive, from an access and mobility management function (AMF) in the VPLMN, a protocol data unit (PDU) session create request message including an indicator for allowing a home-routed session breakout (HR-SBO) and an identifier (ID) of the VPLMN after an inter-public land mobile network (PLMN) handover is performed, transmit, to a home-SMF (H-SMF) in a home PLMN (HPLMN), a PDU session update request message including the ID of the VPLMN and an HR-SBO request message, and receive, from the H-SMF, a PDU session update response message including an authorization result for the HR-SBO.

10. The V-SMF of claim 9, wherein the ID of the VPLMN indicates a handover from a source VPLMN to the VPLMN, and wherein the HR-SBO is unsupported in the VPLMN.

11. The V-SMF of claim 9, wherein the AMF receives SMF selection data including the indicator for allowing the HR-SBO from a unified data management (UDM).

12. The V-SMF of claim 9, wherein the controller is further configured to:

identify a PLMN change based on the ID of the VPLMN.

13. A home-session management function (H-SMF) in a home public land mobile network (HPLMN), the H-SMF comprising:

a transceiver; and a controller configured to:

receive, from a visited-SMF (V-SMF) in a visited PLMN (VPLMN), a protocol data unit (PDU) session update message including a home-routed session breakout (HR-SBO) request message and an identifier (ID) of the VPLMN after an inter-public land mobile network (PLMN) handover is performed, transmit, to a unified data management (UDM), a subscriber data management (SDM) request message, receive, from the UDM, an SDM response message including an authorization result for the HR-SBO, and transmit, to the V-SMF, a PDU session update response message including an authorization result for the HR-SBO.

14. The H-SMF of claim 13, wherein the controller is further configured to:

transmit, to a home-policy control function (H-PCF), a session management (SM) policy control update request message including an HR-SBO policy, and receive, from the H-PCF, an offloading policy for the VPLMN.

15. The H-SMF of claim 13, wherein the UDM identifies whether the HR-SBO is allowed for the VPLMN based on an identity of an AMF.

16. The H-SMF of claim 13, wherein the controller is further configured to:

identify a PLMN change based on the ID of the VPLMN.

* * * * *